(12) United States Patent
Desmedt et al.

(10) Patent No.: US 11,992,011 B2
(45) Date of Patent: May 28, 2024

(54) COMPOUNDS FOR CONTROLLING PLANT PATHOGENS

(71) Applicants: VIB VZW, Zwijnaarde (BE); UNIVERSITEIT GENT, Ghent (BE); TAMINCO BV, Ghent (BE)

(72) Inventors: Willem Desmedt, Bellem (BE); Tina Kyndt, Ghent (BE); Bartel Vanholme, Oostakker (BE)

(73) Assignees: UNIVERSITEIT GENT, Ghent (BE); VIB VZW, Zwijnaarde (BE); TAMINCO BV, Ghent (BE)

( * ) Notice: Subject to any disclaimer, the term of this patent is extended or adjusted under 35 U.S.C. 154(b) by 305 days.

(21) Appl. No.: 16/954,976

(22) PCT Filed: Dec. 20, 2018

(86) PCT No.: PCT/EP2018/086164
§ 371 (c)(1),
(2) Date: Jun. 17, 2020

(87) PCT Pub. No.: WO2019/122107
PCT Pub. Date: Jun. 27, 2019

(65) Prior Publication Data
US 2020/0305428 A1    Oct. 1, 2020

(30) Foreign Application Priority Data
Dec. 21, 2017  (EP) .................................... 17209576

(51) Int. Cl.
*A01N 43/40* (2006.01)
*A01N 37/10* (2006.01)
*A01N 37/40* (2006.01)
*A01N 43/30* (2006.01)

(52) U.S. Cl.
CPC ............. *A01N 43/40* (2013.01); *A01N 37/10* (2013.01); *A01N 37/40* (2013.01); *A01N 43/30* (2013.01)

(58) Field of Classification Search
None
See application file for complete search history.

(56) References Cited

FOREIGN PATENT DOCUMENTS

CN      104016960 A  *  9/2014  ................ A01P 1/00

OTHER PUBLICATIONS

Zhang et al., Journal of Agriculture and Food Chemistry (2014), 62, pp. 4905-4910.*
Davidson et al., Journal of Chemical Ecology (1990), 16(10), pp. 2993-3013.*
Molinari, S., and E. Loffredo, "The Role of Salicylic Acid in Defense Response of Tomato to Root-Knot Nematodes," Physiological and Molecular Plant Pathology 68(1-3):69-78, Jan. 2006.
Schoch, G.A., et al., "Chemical Inactivation of the Cinnamate 4-Hydroxylase Allows for the Accumulation of Salicylic Acid in Elicited Cells," Plant Physiology 130(2):1022-1031, Oct. 2002.
Van De Wouwer, D., et al., "Chemical Genetics Uncovers Novel Inhibitors of Lignification, Including p-Iodobenzoic Acid Targeting CINNAMATE-4-HYDROXYLASE," Plant Physiology 172(1):198-220, Sep. 2016.
International Search Report dated Feb. 19, 2019, issued in corresponding International Application No. PCT/EP2018/086164, filed Dec. 20, 2018, 3 pages.

* cited by examiner

*Primary Examiner* — Brian J Davis
(74) *Attorney, Agent, or Firm* — CHRISTENSEN O'CONNOR JOHNSON KINDNESS PLLC

(57) ABSTRACT

The present invention is in the field of agricultural pathogen control. More specifically the invention relates to compounds capable of inhibiting cinnamate-4-hydroxylase and their use for protecting plants against plant pathogens, in particular against nematodes, fungi and/or bacteria. The invention also provides for compositions comprising the same, methods of making the same, and methods of controlling plant disease.

10 Claims, 16 Drawing Sheets

COMPOUNDS FOR CONTROLLING PLANT PATHOGENS

FIELD OF THE INVENTION

The present invention is in the field of agricultural pathogen control.

More specifically the invention relates to compounds capable of inhibiting cinnamate-4-hydroxylase and their use for protecting plants against plant pathogens, in particular against nematodes, fungi and/or bacteria. The invention also provides for compositions comprising the same, methods of making the same, and methods of controlling plant disease.

BACKGROUND OF THE INVENTION

Plants are subject to multiple potential disease-causing agents, including plant-pathogenic bacteria, fungi and plant-parasitic nematodes.

Bacteria are prokaryotic single-celled microorganisms, generally ranging from 1-2 µm in size that are present on all plant surfaces (epiphytes) and inside plants (endophytes) where they can behave as beneficial or pathogenic to the host. Plant pathogenic bacteria cause many serious diseases of plants throughout the world, and their symptoms range from spots, mosaic patterns or pustules on leaves and fruits, or smelly tuber rots, crown galls to plant death. The pathogenetic bacteria *Erwinia amylovora* was for the first time shown in 1878 to be responsible for fireblight of apples and pears, which is nowadays a widespread disease throughout much of the temperate world. Pathogenic *Agrobacterium tumefaciens* causes crown gall disease on a large number of hosts. Most of the plant pathogenic bacteria are either Gram-positive, classified within the Phylum Actinobacteria, or Gram-negative, in the Phylum Proteobacteria.

Fungi are eukaryotic heterotrophic micro-organisms, than can reproduce both sexually and asexually via the production of spores and other structures. Most plant-pathogenic fungi belong to the Ascomycetes and the Basidiomycetes. Spores may be spread long distances by air or water, or they may be soilborne. Oomycetes are fungus-like organisms. They include some of the most destructive plant pathogens including the genus *Phytophthora*, which includes the causal agents of potato late blight and sudden oak death. Particular species of oomycetes are responsible for root rot.

Nematodes are active, flexible, elongate organisms that live on moist surfaces or in liquid environments, including films of water within soil and moist tissues within other organisms. There are numerous plant-parasitic nematode species, including various root knot nematodes (e.g. *Meloidogyne* sp.), lesion nematodes (e.g. *Pratylenchus* sp.), cyst nematodes (e.g. *Heterodera* sp.), dagger nematodes (e.g. *Xiphinema* sp.) and stem and bulb nematodes (e.g. *Ditylenchus* sp.), among others. Tylenchid nematodes (members of the order Tylenchida), including the families Heteroderidae, Meloidogynidae, and Pratylenchidae, are the largest and most economically important group of plant-parasitic nematodes. Nematode species grow through a series of lifecycle stages and molts. Typically, there are five stages and four molts: egg stage; J1 (i.e. first juvenile stage); M1 (i.e. first molt); J2 (second juvenile stage; sometimes hatch from egg); M2; J3; M3; J4; M4; A (adult). Juvenile ("J") stages are also sometimes referred to as larval ("L") stages.

Both plant-specific and animal-specific species of nematodes have evolved as very successful parasites and are responsible for significant economic losses in agriculture and livestock and for morbidity and mortality in humans.

Bacterial and fungal pathogens or nematode parasites of plants can attack or inhabit all parts of plants, including roots, developing flower buds, leaves, seeds, and stems. Plant parasitic nematodes are classified on the basis of their feeding habits into the broad categories migratory ectoparasites, migratory endoparasites, and sedentary endoparasites. Sedentary endoparasites, which include the root knot nematodes (*Meloidogyne* spp.) and cyst nematodes (Globodera and Heterodera) induce feeding sites ("giant cells" in the case of root knot nematodes and "syncytia" for cyst nematodes) and establish long-term infections within roots that are often very damaging to crops. Pathogenic fungi and bacteria are classified as biotrophs or necrotrophs where biotrophs colonize living plant tissue and obtain nutrients from living host cells and necrotrophics infect and kill host tissue and extract nutrients from the dead host cells.

Compositions, methods and agents for controlling infestations by nematodes and fungal or bacterial pathogens have been provided in several forms. Biological and cultural control methods, including plant quarantines, have been attempted in numerous instances. In some crops, plant resistance genes have been identified that allow disease resistance or tolerance. Chemical compositions such as nematicides, fungicides or bactericides have typically been applied to soil in which the plant pathogens/parasites are present. However, new races of pathogens frequently evolve to break resistance genes and/or to acquire resistance against various chemicals.

There is an urgent need for safe and effective control measures. Factors relating to the disadvantages of current control strategies include heightened concern for the sustainability of agriculture, and new government regulations that may prevent or severely restrict the use of many available agricultural chemical anthelminthic, antifungal or antibacterial agents.

Chemical agents are often not selective, and exert their effects on non-target organisms, effectively disrupting populations of beneficial microorganisms and nematodes, for a period of time following application of the agent. Chemical agents may persist in the environment and only be slowly metabolized. Nematicidal soil fumigants such as chloropicrin and methyl bromide and related compounds are highly toxic. Also fungicides can be dangerous to human health, such as the dicarboximide vinclozolin, which has now been removed from use, and Zinc dimethyldithiocarbamate (Ziram), which is thought to be toxic to humans upon chronic exposure. Similarly, antibacterial agents for agricultural use such as streptomycin are increasingly being challenged, in part because they can accelerate the evolution and spread of antibiotic resistance in bacterial populations, thereby threatening livestock and human health.

These agents may also accumulate in the water table or the food chain, and in higher trophic level species. These agents may also act as mutagens and/or carcinogens to cause irreversible and deleterious genetic modifications. Thus, alternative methods for nematode, fungus or bacterium control in plants and crops are needed.

SUMMARY OF THE INVENTION

The present invention provides compounds and methods of activating the immune response in plants in order to enhance immunity in plants which eventually results in increased pathogen resistance. The method comprises the step of inhibiting the activity of an enzyme involved in the phenylpropanoid pathway in the plant, and more specific of the enzyme cinnamate-4-hydroxylase (C4H), as compared to a corresponding control plant cell, or plant or part thereof, lacking the inhibition.

In one embodiment, the invention provides a method of promoting/enhancing plant resistance to parasitic nematodes, fungi and/or bacteria by inhibiting C4H in a plant, said method comprising applying an exogenous compound capable of inhibiting the activity of C4H in said plant. The compound can act "directly" in the plant by inhibiting C4H, or in in the alternative, the compound can, after administration to the plant, be transformed/processed in planta to an effective C4H inhibitor and as such perform its activity.

In a particular embodiment, the compound of the invention is a small molecule (an organic compound having a low molecular weight (<900 daltons) that may help regulate a biological process), even more particular an aromatic carboxylic acid or a benzoic acid derivative bearing a terminal alkyne function. In a specific embodiment the small molecule is characterized by the presence of a benzodioxole comprising a carboxylic acid group. Said compound is capable of inhibiting or reducing the activity of C4H in planta. In particular, the compound of the invention has the general Formula I, Ie, II, Ill or IV as disclosed herein, or either one of the Formulas of the subgroup Ia-e and IIa-e, or a stereoisomer, tautomer, hydrate, salt, ester, solvate and/or functional analog thereof. Even more in particular, the compound is selected from the group consisting of: piperonylic acid (PA) (or optionally a precursor thereof such as 3,4-methylenedioxycinnamic acid (MDCA), piperic acid or piperine; in particular MDCA); 4-iodobenzoic acid (4-IBA); 4-trifluoromethylbenzoic acid; 4-propynyloxybenzoic acid (4-PB) and 3-(4-pyridyl)acrylic acid (3PA); or a stereoisomer, tautomer, hydrate, salt, ester, solvate and/or functional analog thereof. Suitable concentrations of the compound in the methods and uses as provided herein are in the range of about 10 to about 1000 μM, in particular of 10 to 500 μM.

The invention encompasses the use of the compounds described herein for preventing, treating and/or reducing infection of plants with bacterial/fungal pathogens and/or parasitic nematodes, and/or to control (e.g. prevent or reduce) plant damage caused thereby.

The invention further discloses the use of the compounds described herein for increasing the resistance of a plant against a pathogen, in particular against a bacterial/fungal pathogen or a parasitic nematode such as e.g. a root-knot nematode, a root-lesion nematode or/and a cyst nematode, even more in particular a nematode belonging to the genus selected from the group consisting of Meloidogyne, Heterodera, Globodera, Pratylenchus, Aphelenchoides, Xiphinema, Radopholus, Bursaphelenchus, Rotylenchulus, Nacobbus, Longidorus, Ditylenchus and Trichodorus. In a further embodiment, the pathogen is a phytopathogenic fungus, selected from the genera *Magnaporthe, Botrytis, Puccinia, Fusarium, Blumeria, Mycosphaerella, Colletrotrichum, Ustilago, Melampsora, Rhizoctonia, Phaksora Alternaria, Sclerotinia*, and *Cladosporium*. In an even further embodiment, the pathogen is a plant pathogenic bacterium, from the genera *Pseudomonas, Ralstonia, Agrobacterium, Xanthomonas, Erwinia, Xylella, Dickeya, Pectobacterium, Clavibacter, Burkholderia, Bacillus, Corynebacterium, Streptomyces* and *Candidatus Liberibacter*.

In a further embodiment, the present invention discloses a composition or formulation comprising a compound as described herein and a diluent, an additive, a plant (micro) nutrient, an emulsion stabilizer, a surfactant, a buffer, a crop oil, a drift inhibitor and/or an (inert) substratum. In particular, the composition is a foliar spray or a seed coating.

Furthermore, the compounds or compositions can further comprise or be used in combination with one or more fertilizers, biostimulants, herbicides, fungicides, bactericides, acaricides, nematicides and/or insecticides. In particular the composition is an agrochemical composition comprising any one or more of the compounds of formula I, Ia-e, II, IIa-e, Ill or IV and at least one excipient.

In another embodiment, the compound or composition is applied to a plant or part thereof, to the soil surrounding the plant or in the substrate used for growing the plant. Preferred application methods are foliar treatment (e.g. by spraying), seed treatment (e.g. by seed coating) or soil treatment (e.g. by soil drenching). Plant parts can be a seed, fruit, fruit body, leaf, stem, shoot, stalk, flower, root, tuber or rhizome.

The invention further relates to a seed comprising a coat of or including a compound as provided herein and a method for controlling (e.g. preventing, inhibiting or treating infection of plants with) plant pathogens such as parasitic nematodes, fungi and/or bacteria, said method comprising applying a compound (or composition comprising it) to said plant, in particular wherein said compound is capable of reducing the activity of C4H in said plant.

DESCRIPTION OF THE INVENTION

Figure 1:
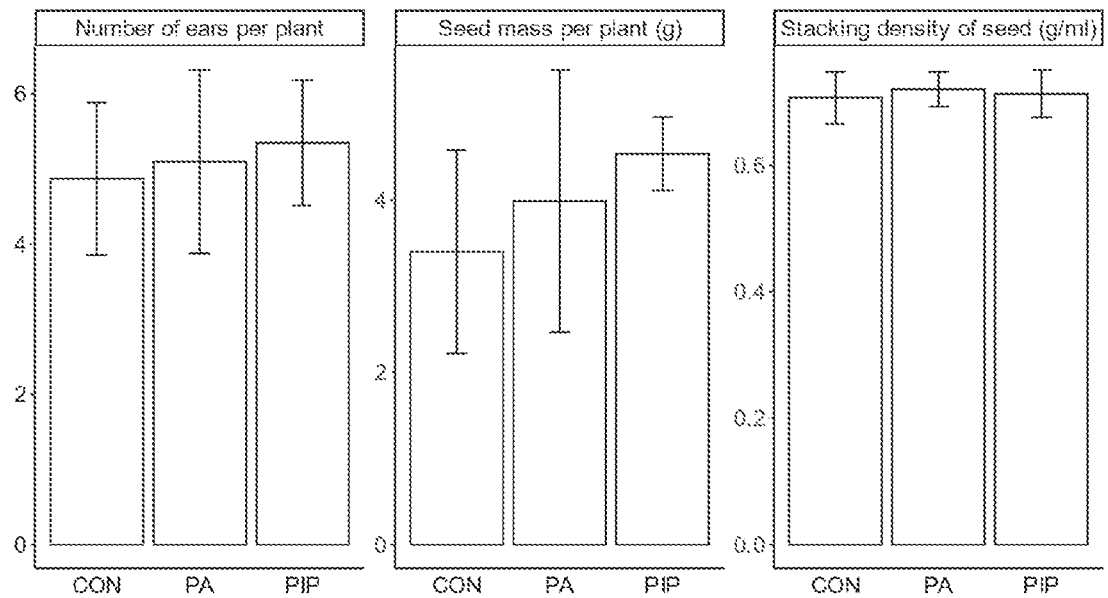
FIG. 1: mean number of ears, seed mass and stacking density of wheat plants treated with piperonylic acid (PA), piperine (PIP) or a control treatment (CON), with error bars indicating standard deviation. N=24 (72 plants in total, 3 plants per pot).

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The term "about" as used herein when referring to a measurable value such as a parameter, an amount, a temporal duration, and the like, is meant to encompass variations of +/−20% or less, preferably +1-10% or less, more preferably +/−5% or less, of and from the specified value, insofar such variations are appropriate to perform in the disclosed invention. It is to be understood that the value to which the modifier "about" refers is itself also specifically, and preferably, disclosed. Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any>3, >4, >5, >6 or >7 etc. of said members, and up to all said members. All references, and teachings specifically referred to, cited in the present specification are hereby incorporated by reference in their entirety. Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Reference throughout this specification to "one embodiment" or "an embodiment" means that a particular feature, structure or characteristic described in connection with the embodiment is included in at least one embodiment of the present invention.

The present invention relates to methods and compounds which can be used to stimulate plant defense and/or immune responses against pathogens, e.g. nematodes, bacteria and/or fungi. By acting via the plant, these compounds have a minimal impact on beneficial soil organisms, thereby making them more suitable crop protection agents. In addition, it was demonstrated that these compounds have a positive effect on plant growth and more specific on for example root and shoot development (e.g. increased number and/or height) under nematode-infected conditions. Hence, the compounds of the invention can be used to improve tolerance to pathogens, in particular nematodes, pathogenic fungi and/or bacteria. The present invention demonstrates that the compounds inhibit the attraction, invasion, migration, establishment of feeding sites, feeding proliferation and/or maturation of plant parasitic nematodes, and/or reduce lesion sites and number of feeding sites such as e.g. the production of galls or syncytia by such nematodes. It was furthermore shown that the compounds of the invention improve seedling emergence in *Fusarium*-infested soil, and inhibit the formation and spreading of lesions caused by phytopathogenic fungi and bacteria such as *Botrytis* and *Pseudomonas*.

The compounds of the present invention are inhibitors/inactivators of cinnamate-4-hydroxylase (C4H) (NCBI Reference Sequence: NP_180607.1), the second enzyme of the phenylpropanoid pathway and a member of the superfamily of Cytochrome P450 heme-thiolate proteins (Schalk et al., 1998). Hence the compounds operate by stimulating the plant defense mechanism through selective perturbation of the phenylpropanoid pathway. This was unexpected since the phenylpropanoid pathway has a critical role in plant defense and is responsible e.g. for reinforcing the cell wall upon pathogen attack, for the biosynthesis of molecules such as flavonoids that are toxic or inhibitory to nematodes and for altering the balance of plant hormones in the plant upon pathogen attack to shift resources from growth to defense. Surprisingly it was found that (temporarily) inhibiting said pathway, and especially C4H, results in a protective effect against plant pathogens, in particular plant-parasitic nematodes, fungi and/or bacteria.

In a particular embodiment, the present invention provides a method of enhancing plant immunity, in particular by inhibition or inactivation of the enzyme C4H, said method comprising the step of administering to a plant a(n) (exogenous) compound, in particular a small molecule, capable of disrupting the function or activity of C4H, e.g. by binding C4H. As used herein a "cinnamate-4-hydroxylase (C4H) inhibitor" relates to a compound capable of reducing or inhibiting C4H activity in planta. As used herein the term "inhibition of the activity of C4H" or "inhibiting C4H" shall be interpreted to mean any change in a level of synthesis of the functional C4H enzyme or a C4H biological activity, which can include a reduced level of functional C4H enzyme present in a plant cell, reduced efficacy of the C4H enzyme, or any other means which affects one or more of the biological properties of a C4H enzyme such as e.g. its role in the conversion of trans-cinnamic acid into 4-hydroxycinnamic acid in plants.

Techniques for measuring and determining the (effect on) activity of C4H are well known to the one of ordinary skill in the art. Useful methods to determine inhibition of C4H activity are (incorporated by reference):

Measurement of the conversion efficiency of trans-cinnamic acid labeled with $^{13}$C or $^{14}$C in the presence of a potential C4H inhibitor in plant cell cultures or in yeast microsomes in which the CYP73A1 is expressed (as described in Schoch et al. 2002; Van de Wouwer et al. 2016; Schalk et al. 1998). Representative inhibition kinetics values obtained in cell suspensions for both competitive and irreversible C4H inhibitors can be found in Table 1 in Schoch et al., 2002 (incorporated by reference).

Inhibition of the C4H enzyme increases the concentration of free trans-cinnamic acid, which is rapidly conjugated in planta. The accumulation of trans-cinnamic acid amino acid conjugates, which can be quantified using HPLC-MS, can be used as a proxy measure for C4H inhibition in planta. This approach is outlined in Steenackers et al. 2016. Briefly, *A. thaliana* seedlings are grown in vitro on medium containing 10 µM of the suspected C4H inhibitor, after which they are collected, pooled and subjected to HPLC analysis. Representative values for the increase in the quantity of trans-cinnamic acid conjugates are found in Supplemental FIG. S2 in Steenackers et al. 2016 (incorporated by reference).

Inhibition of the C4H enzyme causes a compensatory upregulation of the C4H gene, as shown in Example 20. Fourteen-day old rice plants (*Oryza sativa* cv. Bomba) treated with foliarly twenty-four and three hours prior to harvest with 100 µM of PA and MDCA showed a ten-fold and three-fold increase of C4H expression in the root system respectively.

Primary root elongation of *Arabidopsis thaliana* seedlings upon continuous exposure to C4H inhibitors is greatly reduced. The IC50-root, the dose of candidate-inhibitor required to reduce primary root elongation by 50%, can be another indirect measure of C4H inhibitor activity. This procedure is described in Steenackers et al. 2016. Reference IC50-root values for C4H inhibitors are 5.07 µM for MDCA (Steenackers et al. 2016) and 40.0 µM for PA (unpublished data).

When *Arabidopsis thaliana* seedlings are grown in vitro with continuous exposure to 10 µM of a suspected C4H inhibitor, a clear impairment of lignification in the Casparian strip of five day old seedlings should be visible (fewer lignified cells). For reference, PA, MDCA and 4-IBA increase the number of non-lignified endodermal cells in the Casparian strip region by 134, 104 and 57% respectively (Van de Wouwer et al., 2016).

In planta assays are particularly useful to determine inhibition activity of structural analogs of the compounds provided herein, and of "C4H inhibitor precursors", i.e. compounds that are transformed in planta to an effective C4H inhibitor. In the context of the present invention, examples of precursors for piperonylic acid (PA) are 3,4-methylenedioxycinnamic acid (MDCA), piperic acid and piperine. Hence the invention also relates to the use of C4H inhibitor precursors in the methods, compositions and applications/uses as described herein.

In a specific embodiment, the C4H inhibitor is a small molecule. In one embodiment, the compound is an aromatic carboxylic acid or is characterized by the presence of a benzodioxole comprising a carboxylic acid group.

In particular, the compound of the present invention has the general Formula I, or a stereoisomer, tautomer, hydrate, salt or solvate thereof:

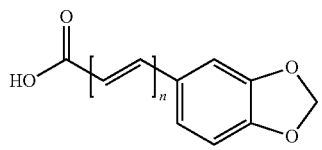

wherein n is 0, 1, 2, 3, or 4.
More in particular n is 0.

In a further embodiment the compound of the present invention has the general Formula II, or a stereoisomer, tautomer, hydrate, salt or solvate thereof:

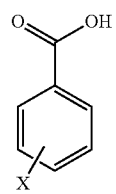

wherein X is a halogen or —R, wherein R is selected from —CF3, or —O—C1-6alkynyl. In a particular embodiment X is —I, and R is -4-O-propynyl, -3-O-propynyl or -4-CF3.

In another embodiment, the compound of the invention has the Formula III, or a stereoisomer, tautomer, hydrate, salt or solvate thereof:

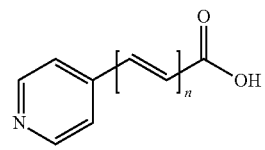

wherein n is 0, 1, 2, 3, or 4.
More in particular n is 1.

As used herein, the term "halogen" encompasses fluorine (F), chlorine (CI), bromine (Br), or iodine (I), in particular iodine (I). The term "alkynyl", as used herein, means straight-chain or branched-chain hydrocarbon radicals containing at least one carbon-carbon triple bond.

Examples of alkynyl radicals include ethynyl, propynyl, butynyl, isobutynyl, and pentynyl, hexynyl, and the like. In a particular embodiment, the alkynyl is a propynyl. An "optionally substituted alkynyl" refers to an alkynyl having optionally one or more substituents (for example 1, 2, 3 or 4) at any available point of attachment. Non-limiting examples of such substituents include halo, hydroxyl, carbonyl, nitro, amino, oxime, imino, azido, hydrazino, cyano, aryl, heteroaryl, cycloalkyl, acyl, alkylamino, alkoxy, thiol, alkylthio, carboxylic acid, acylamino, alkyl esters, carbamate, thioamido, urea, sullfonamido and the like.

In a specific embodiment, the compound of the invention is selected from the group of compounds as presented in Table 1.

TABLE 1

| Name | Structure | Formula |
|---|---|---|
| Piperonylic acid (PA) | | Ia |
| 3,4-methylenedioxycinnamic acid (MDCA) | | Ib |
| 3,4-(Methylenedioxy)phenylacetic acid | | Ic |

TABLE 1-continued

| Name | Structure | Formula |
|---|---|---|
| Piperic acid | | Id |
| Piperine | | Ie |
| 4-iodobenzoic acid (4-IBA) | | IIa |
| 4-propynyloxybenzoic acid | | IIb |
| 4-propynyloxymethylbenzoic acid | | IIc |
| 3-propynyloxybenzoic acid | | IId |
| 4-trifluoromethylbenzoic acid | | IIe |
| 3-(4-pyridyl)-acrylic acid | | III |
| 2-hydroxy-1-napthoic acid (2HN) | | IV |

Even more specific, the compound of the invention or C4H inhibitor is selected from the group consisting of: piperonylic acid (PA) (or optionally a precursor thereof such as 3,4-methylenedioxycinnamic acid (MDCA), piperic acid or piperine; in particular MDCA); 4-iodobenzoic acid (4-IBA); 4-trifluoromethylbenzoic acid; 4-propynyloxybenzoic acid (4-PB) and 3-(4-pyridyl)acrylic acid (3PA); or a stereoisomer, tautomer, hydrate, salt, ester and/or solvate thereof. In a further embodiment, the compound is selected from the group consisting of piperonylic acid (PA), 3,4-methylenedioxycinnamic acid (MDCA), piperic acid and piperine, or a stereoisomer, tautomer, hydrate, salt, ester and/or solvate thereof. In another embodiment, the compound is selected from the group consisting of 4-iodobenzoic acid (4-IBA), 4-trifluoromethylbenzoic acid, 4-propynyloxymethylbenzoic acid, 4-propynyloxybenzoic acid (4-PB) and 3-propynyloxybenzoic acid, or a stereoisomer, tautomer, hydrate, salt, ester and/or solvate thereof. In still another embodiment, the compound is 3-(4-pyridyl)acrylic acid (3PA), or a stereoisomer, tautomer, hydrate, salt, ester and/or solvate thereof. A preferred compound is piperonylic acid (PA). Other compounds can be evaluated to be functional equivalent to the compounds of the invention, in particular PA, by using the assays as provided herein, e.g. the compound can be found to has a similar effect as the reference compound, e.g. PA, in at least 1, 2 or 3 of the assays as described herein. Hence also envisaged in the present invention is a "functional equivalent or analog" of the compounds provided herein, being a compound having a minor structural difference compared to the reference compound (so called structural analog) but having the same envisaged function or property. In one embodiment, the functional analog is a small molecule characterized by the presence of an aromatic carboxylic acid or by the presence of a benzodioxole comprising a carboxylic acid group.

The term "compound(s) of the invention," and equivalent expressions, are meant to embrace the prodrugs, the pharmaceutically acceptable salts, the oxides, the solvates, e.g. hydrates, and inclusion complexes of that compound, where the context so permits, as well as any stereoisomeric or tautomeric form, or a mixture of any such forms of that compound in any ratio, unless otherwise specified. Furthermore, since the compounds of the invention carry an acidic moiety, suitable agrochemical acceptable salts thereof may include alkali metal salts, e.g. sodium or potassium salts; alkaline earth metal salts, e.g. calcium or magnesium salts; and salts formed with suitable organic ligands, e.g. quaternary ammonium salts. A salt can be any ionic compound that can be formed by the neutralization reaction of an acidic compound as provided herein and a base. Examples include, but or not limited to, an ammonium, a potassium or isopropylamine salt. In another embodiment, base salts are formed from bases which form non-toxic salts, including aluminum, arginine, benzathine, choline, diethylamine, diolamine, glycine, lysine, meglumine, olamine, tromethamine and zinc salts. In one embodiment, hemisalts of acids and bases may also be formed, for example, hemisulphate and hemicalcium salts. In a particular embodiment, the invention also encompasses esters derived from the compounds of the invention, i.e. wherein the —OH (hydroxyl) group of the carboxylic acid is replaced by an —O-alkyl (alkoxy) or other organic group. Hence, the carboxylic acid (—COOH) in Formulas I, II, III and IV (including individual compounds of the subgroups) is replaced by R1-O—C=O wherein R1 is C1-C4-alkyl. Examples include, but not limited to, methyl, ethylhexyl or ethyl esters. Said esters can be of particular interest for a foliar application in view of enhanced penetration properties.

The invention provides methods, compounds and compositions for controlling plant pathogens such as bacteria, viruses, fungi and nematodes, and in particular for controlling parasitic nematodes, fungi and/or bacteria, more in particular nematodes. The term "controlling plant pathogens and parasitic nematodes" refers to reducing the overall negative effect of plant pathogenic bacteria and fungi, or parasitic nematodes on plants such that the plants experience a decreased amount of negative effects by said pathogens/nematodes as compared to plants not treated with the compound. The overall negative effect by plant pathogenic bacteria/fungi or parasitic nematodes may be reduced, such as by reducing the overall number or density of plant parasitic nematodes (i.e., decrease in nematode population) on the plant or in the soil or by reducing the severity or extent of negative effects of the pathogens (eg. number of lesions, spots, wilting, gall formation, rot, seedling death, growth reduction, yield losses, etc.), or the plant parasitic nematodes (i.e., nematode population remains unchanged but exhibit fewer detrimental effects such as e.g. cyst or gall formation, number of lesions, growth reduction, yield losses, etc.). For fungi and bacteria, positive effects on the treated plant using the compounds of the invention are reductions in the number, size and spread of root, leaf, stem or fruit lesions, a reduced impact from vascular wilt diseases, improved emergence in soils infested with soilborne fungi, improved yield, improved post-harvest organoleptic and storage properties etc.

As used herein, the term "nematode" refers to multicellular animals in the phylum Nematoda. "Plant parasitic nematode" refers to nematode parasites of plants which can be found in/on plant roots, seeds, flowers, leaves, stems, or the soil in which the plant is growing. Plant parasitic nematodes feed on all parts of the plant, including roots, stems, leaves, flowers and seeds.

"Cyst nematodes" (genera Heterodera and Globodera) and "root-knot nematodes" (genus *Meloidogyne*), in particular, cause significant economic loss in plants, especially crop plants. Examples of cyst nematodes include, *H. schachtii* (sugar beet cyst nematode), *H. avenae* (cereal cyst nematodes), *H. glycines* (soybean cyst nematode), *H. sacchari* (sugarcane cyst nematode), *H. carotae* (carrot cyst nematode), *G. pallida* (white potato cyst nematode) and *G. rostochiensis* (yellow potato cyst nematode). Root-knot nematodes include, for example, *M. graminicola, M. javanica, M. incognita, M. arenaria, M. chitwoodi, M. artiellia, M. fallax, M. hapla, M. microtyla, M. partityla, M. panyuensis, M. naasi, M. exigua, M. enterolobii* and *M. paranaensis*. These pathogens establish "feeding sites" in the plant, by causing the morphological transformation of plant cells into giant cells or syncytia, which block the flow of nutrients and photosynthesis products. Hence, nematode "infection" refers to invasion of and feeding upon the tissues of the host plant. Other nematodes that cause significant damage include the "root-lesion" nematodes such as Pratylenchus, particularly *P. penetrans*, which infects maize, rice and vegetables, P. brachyurus which infects pineapple, P. zeae, which infects cereals, sugarcande and coffee, *P. coffeae*, which infects coffee and banana, and *P. thornei*, which infects wheat.

In one aspect, "plant parasitic nematodes" include microorganisms from the genera Meloidogyne, Heterodera, Globodera, Pratylenchus, Aphelenchoides, Xiphinema, Radopholus, Bursaphelenchus, Rotylenchulus, Nacobbus, Longidorus, Ditylenchus and Trichodorus, and in particular from the genera Meloidogyne, Heterodera and Pratylenchus. In a particular embodiment, the nematodes are members of the order Tylenchida.

In particular, the nematode species is selected from the group consisting of: Heterodera glycines, Heterodera schachtii, Globodera rostochiensis, Meloidogyne incognita, Meloidogyne graminicola, Pratelynchus penetrans, Globodera pallida, Heterodera avenae, Heterodera sacchari, Heterodera zeae, Heterodera carotae, Pratylenchus coffeae, Pratylenchus neglectus, Pratylenchus zeae, Pratylenchus loosi, Meloidogyne javanica, Meloidogyne arenaria, Meloidogyne hapla, Meloidogyne fallax, Meloidogyne chitwoodi. Meloidogyne exigua, Aphelenchoides besseyi, Aphelenchoides fragariae, Xiphinema index, Radopholus similis, Bursaphelenchus xylophilus, Rotylenchulus reniformis, Nacobbus abberans, Longidorus elongatus, Ditylenchus destructor, Ditylenchus dipsaci, Ditylenchus angustus and Tricochodorus minor.

Examples of phytopathogenic bacteria include the genera Pseudomonas, Ralstonia, Rhizobium, Agrobacterium, Xanthomonas, Erwinia, Xyllela, Dickeya, Pectobacterium, Streptomyces, Clavibacter, Candidatus Liberibacter, Bacillus, Corynebacterium and Burkholderia. Examples of phytopathogenic viruses include Potato Virus X, Potato Virus Y, Tobacco Mosaic Virus, Cucumber Mosaic Virus, Tomato Yellow Leaf Curl Virus, Tomato Spotted Wilt Virus and Citrus Tristeza Virus. Fungal plant pathogen species are primarily in the phyla Ascomycota and Basidiomycota. Among ascomycetes, plant pathogens are in various classes such as the Dothideomycetes (e.g., Cladosporium spp.), Sordariomycetes (e.g., Magnaporthe spp.), or the Leotiomycetes (e.g., Botrytis spp.). Basidiomycetes are represented by the two largest plant pathogen groups: the rusts (Pucciniomycetes) and the smuts (spread among the subphylum of Ustilaginomycotina). Examples of phytopathogenic fungi include the genera Magnaporthe, Botrytis, Puccinia, Fusarium, Blumeria, Mycosphaerella, Colletotrichum, Ustilago, Phakopsora, Alternaria, Sclerotinia, Cladosporium and Rhizoctonia.

Examples of phytopathogenic oomycetes (formerly classified as fungi) are species of the genera Pythium and Phytophtora. Pythium-induced root rot is a common crop disease In a particular embodiment, the control of plant parasitic nematodes, fungi and/or bacteria is realized by an improved resistance to detrimental effects of pathogens and parasites, especially nematodes and results in an enhancement in the overall health of the subject plants, such as a greater production of some desirable parameter, such as for example the amount of harvested crop produced.

The term "improved resistance to disease," as used herein, refers to an increase of plant defense in a healthy plant or a decrease in disease severity of a plant or a population of plants, or in the number of diseased plants in a plant population.

A particular advantage is that the compound of the invention exhibits no (significant) toxicity and hence has no harmful effects on non-target organisms at a working concentration adapted to be applied to the plant. E.g. the compounds provided herein were demonstrated not to be toxic for mice, flies, nematodes, bacteria and fungi. Hence in a specific embodiment the compounds of the invention are not considered as nematicidal, fungicidal or bactericidal. Nematicides are, by definition, chemicals that kill nematodes. Said features can be determined by methods known in the art such as e.g. provided in the examples section or by a direct-contact bioassay such as described in Faske & Hurd 2015. In said assay, compounds are considered as nematicidal if nematode survival after 24 hours of exposure to a 100 µM aqueous solution of the test compound is less than 60%, in particular less than 50%, more particular less than 40%, even more particular less than 30% compared to the control group.

Equally, fungicides and bactericides are chemicals that kill resp. fungi and bacteria. Said features can be determined by methods known to the skilled person, or e.g. as provided in the present examples.

Of particular advantage is that the present compounds can be used pre-emptively (e.g. to seedlings) as well as curative, require only a simple formulation and are highly stable at room temperature. The use as a priming agents will delay or even prevent the damage to the plant when infected.

In a further embodiment, the compound of the invention is isolated (e.g. in substantially purified form) or synthetically made using standard techniques, or commercially available. In a particular embodiment, the compound is not part of a natural extract made by extracting a part of a raw material, often by using a solvent such as ethanol or water (e.g. aqueous or ethanolic extracts of seeds or plants; oils). More in particular, the compounds (as part of a composition) are employed in a purity of from 90% to 100%, preferably from 95% to 100% (according to their NMR spectrum).

The present invention also encompasses (the use of) a composition or formulation comprising a compound of the invention. An "agrochemical composition" as used herein means a composition for agrochemical use, such as use in the agrochemical industry (including agriculture, horticulture, floriculture and home and garden uses for protecting plants or parts of plants, crops, bulbs, tubers, fruits (e.g. from harmful organisms, diseases or pests) as herein defined, comprising at least one active substance of a compound as defined herein, optionally with one or more additives favoring optimal dispersion, atomization, deposition, leaf wetting, distribution, retention and/or uptake of agrochemicals. Typically such composition or formulation further comprises at least one additional component or excipient such as a surfactant, a (solid or liquid) diluent and/or an emulsion stabilizer, which serves as a carrier. The (agrochemical) formulation generally comprises between 0.01 and 95%, preferably between 0.1 and 90%, most preferably between 0.5 and 90%, by weight of active substances. With "surfactant" is meant herein a compound that lowers the surface tension of a liquid, allowing easier spreading. The surfactant can be a detergent, an emulsifier (including alkyl polyglucosides glycerol ester or polyoxyethylene (20) sorbitan monolaurate), a dispersing agent (including sodium chloride, potassium chloride, potassium nitrate, calcium chloride or starch of corn), a foaming agent (including derivates of tartric acid, malic acid or alcohols), a penetration enhancer, a humectant (including ammonium sulfate, glycerin or urea) or a wetting agent of ionic or non-ionic type or a mixture of such surfactants. In particular, the surfactants used in the composition as defined herein are penetration enhancers, dispersing agents or emulsifiers. The term "penetration enhancer" is understood herein as a compound that accelerates the uptake of active ingredient through the cuticle of a plant into the plant, i.e. the rate of uptake, and/or increases the amount of active ingredient absorbed into the plant. Classes of substances known as penetration enhancers, include alkyl phosphates, such as tributyl phosphate and tripropyl phosphate, and naphthalenesulphonic acid salts. With "dispersing agent" is meant a substance added to a suspension, usually a colloid, to improve the separation of particles and to prevent settling or clumping. The term "emulsifier" as used herein refers to a substance that stabilizes an emulsion, i.e. a mixture of two or more liquids. Mention can be made of the emulsifiers sold under the trade names Tween® 20, which essentially comprises polyoxyethylene (20) sorbitan monolaurate (polysorbate 20), and Radia®, which essentially comprises alkyl polyglycosides.

As an example, a surfactant comprises one or more of the following components: castor oil ethoxylate, rapeseed methyl ester, alkyl phosphates, tributyl phosphate, tripropyl phosphate, naphthalenesulphonic acid salts, organic sulfonate/2-methylpentane-2,4-diol, alkylpolyglucoside, siloxanes derivates, alkylsulfonates, polycarboxylates, lignosulfonates, alkoxylated triglycerides, fatty amines polymers, dioctylsulfosuccinates or polyoxyethylene (20) sorbitan monolaurate (polysorbate 20).

An additive, a plant (micro) nutrient, a buffer, a crop oil, a drift inhibitor and/or an (inert) substratum can also be part of the composition. Typically the compound of the invention may be administered to a plant in a suitable agriculturally acceptable formulation, including but not limited to, a growing medium such as soil or hydroponic liquid medium, dusts, granules, solution concentrates, emulsifiable concentrates and wettable powders. The term "agriculturally acceptable" indicates that the formulation is non-toxic and otherwise acceptable for application to a plant, whether applied indoors (e.g. in a contained environment) or outdoors (e.g. in a non-contained environment that is exposed to other plant, animal and human life). The formulation may include additives such as solvents, for example ketones, alcohols, aliphatic ethers, fillers and carriers, for example clay and minerals. The general types of solid compositions are dusts, powders, granules, pellets, prills, pastilles, tablets, filled films (including seed coatings) and the like, which can be water dispersible ("wettable") or water soluble. Films and coatings formed from film forming solutions or flowable suspensions are particularly useful for seed treatment. Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about one to several thousand liters per hectare, but more typically are in the range from about ten to several hundred liters per hectare. Sprayable formulations can be tank mixed with water or another suitable medium for foliar treatment by aerial or ground application, or for application to the growing medium of the plant. Liquid and dry formulations can be metered directly into drip irrigation systems or metered into the furrow during planting.

Liquid diluents include, for example, water, NN-dimethylalkanamides (e.g., NN dimethylformamide), limonene, dimethyl sulfoxide, N-alkylpyrrolidones (e.g., N methylpyrrolidinone), alkyl phosphates (e.g., triethyl phosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters, alkyl and aryl benzoates and γ-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically C6-C22), such as plant seed and fruit oils (e.g., oils of olive, castor, linseed, sesame, corn (maize), peanut, sunflower, grapeseed, safflower, cottonseed, soybean, rapeseed, coconut and palm kernel), animal sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, Solvents Guide, 2nd Ed., Interscience, New York, 1950.

In a particular embodiment, the invention provides a fibrous composition comprising a non-woven fiber and an effective amount of at least one compound as provided herein, covalently attached or stably adsorbed to the fiber.

The composition or formulation will typically contain effective amounts of the compound as described herein. An "effective amount" means that they are used in a quantity which allows to obtain the desired effect but which does not give rise to any phytotoxic symptom on the treated plant. A particular embodiment uses the compound of the invention, which advantageously can be administered in concentrations up to 500 µM, 600 µM, 700 µM, 800 µM, 900 µM or 1000 µM; or in concentrations ranging from about 0.1 µM to about 1000 µM, more specific at concentrations ranging from about 1 µM to about 800 µM, even more specific from about 1 µM to about 500 µM, and more in particular at concentrations of at least or around 5,10, 15, 20, 25, 30, 35, 40, 45, 50, 55, 60, 65, 70, 75, 80, 85, 90, 95, 100, 150, 200, 300, 400, 500, 600, 700, 800 to 900 µM. In particular, the amount used is non-nematicidal and/or non-fungicidal.

The compounds of the invention can be used individually or already partially or completely mixed with one another to prepare the composition according to the invention. It is also possible for them to be packaged and used further as combination composition such as a kit of parts. According to the method of the present invention, the compounds or composition according to the invention can be applied once to a soil/plant (part)/crop, or it can be applied two or more times after each other with an interval between every two applications.

Any plant/crop can be treated. The term "plant (or plants)" is a synonym of the term "crop" which is to be understood as a plant of economic importance and/or a men-grown plant. The methods, compounds and compositions of the present invention may be applied to any monocot or dicot plant, depending on the pathogen (e.g. nematode) control desired. Exemplary plants protected by the present invention with plant-parasitic (nematode, fungal or bacterial) species include, but are not limited to, alfalfa: *Meloidogyne hapla, Meloidogyne incognita, Meloidogyne javanica, Ditylenchus dipsaci, Pratylenchus* spp., *Paratylenchus* spp., *Xiphinema* spp.; banana: *M. incognita, M. arenaria, M. javanica, Radopholus similis, Helicotylenchus multicinctus, Pratylenchus coffeae, Rotylenchulus reniformis*; beans and peas: *Meloidogyne* spp., *Heterodera* spp., *Belonolaimus* spp., *Helicotylenchus* spp., *Rotylenchulus reniformis, Paratrichodorus anemones, Trichodorus* spp.; cassava: *Meloidogyne* spp., *Rotylenchulus reniformis*; cereals: *Meloidogyne naasi* (barley, wheat, rye), *Heterodera*

*avenae*; chickpea: *Meloidogyne* spp., *Heterodera cajani, Rotylenchulus reniformis, Hoplolaimus seinhorsti, Pratylenchus* spp.; citrus: *Meloidogyne* spp., *Tylenchulus semipenetrans, Radopholus similis, Radopholus citrophilus, Hemicycliophora arenaria, Pratylenchus* spp., *Bolonolaimus longicaudatus, Trichodorus* spp., *Paratrichodorus* spp., *Xiphinema* spp.; clover: *Meloidogyne* spp., *Heterodera trifolii*; corn: *Meloidogyne incognita, Pratylenchus* spp., *Paratrichodorus* minor, *Longidorus* spp., *Hoplolaimus columbus*; cotton: *Meloidogyne incognita, Belonolaimus longicaudatus, Rotylenchulus reniformis, Hoplolaimus galeatus, Pratylenchus* spp., *Tylenchorhynchus* spp., *Paratrichodorus* minor; grapes: *Meloidogyne* spp., *Xiphinema* spp., *Pratylenchus vulnus, Tylenchulus semipenetrans, Rotylenchulus reniformis*; grasses: *Pratylenchus* spp., *Longidorus* spp., *Paratrichodorus christiei, Xiphinema* spp., *Ditylenchus* spp.; peanut: *Meloidogyne hapla, Meloidogyne arenaria, Ditylenchus* spp., *Pratylenchus* spp., *Criconemella* spp., *Belonolaimus longicaudatus*; pigeon pea: *Meloidogyne* spp., *Heterodera cajani, Rotylenchulus reniformis, Hoplolaimus seinhorsti, Pratylenchus* spp.; potato: *Meloidogyne* spp., *Globodera rostochiensis, Globodera pallida, Pratylenchus* spp., *Trichodorus primitives, Ditylenchus* spp., *Paratrichodorus* spp., *Nacobbus aberrans*; rice: *Meloidogyne* spp., *Aphelenchiodes besseyi, Ditylenchus angustus, Hirchmanniella* spp., *Heterodera* spp.; small fruits: *Meloidogyne* spp.; *Pratylenchus* spp., *Xiphinema* spp., *Longidorus* spp., *Paratrichodorus christiei, Aphelenchoides* spp.; soybean: *Meloidogyne incognita, Meloidogyne javanica, Heterodera glycines, Belonolaimus* spp., *Hoplolaimus columbus*; sugar beet: *Meloidogyne* spp., *Heterodera schachtii, Ditylenchus dipsaci, Nacobbus aberrans, Trichodorus* spp., *Longidorus* spp., *Paratrichodorus* spp.; sugar cane: *Meloidogyne* spp., *Pratylenchus* spp., *Radopholus* spp., *Heterodera* spp., *Hoplolaimus* spp., *Helicotylenchus* spp., *Scutellonema* spp., *Belonolaimus* spp., *Tylenchorhynchus* spp., *Xiphinema* spp., *Longidorus* spp., *Paratrichodorus* spp.; tobacco: *Meloidogyne* spp., *Pratylenchus* spp., *Tylenchorhynchus claytoni, Globodera tabacum, Trichodorus* spp., *Xiphinema americanum, Ditylenchus dipsaci, Paratrichodorus* spp.; and tomato: *Meloidogyne* spp., *Pratylenchus* spp.

In a specific embodiment, the plants to be treated are these crops with the greatest estimated losses due to pathogens and nematode parasitism i.e. corn, cotton, cucurbits, leguminous vegetables, peanut, solanaceous vegetables (e.g. tomato, patato, eggplant, capsicum and chillies), lettuce, strawberry, potato, onion, wheat, rice, banana, tree fruits (e.g. apple, citrus), coffee, soybean, sugarcane, sugar beet and tobacco, in particular tomato, wheat, sugar beet, onion and rice.

In a further embodiment of the present invention, the compound or a composition comprising the compound is applied to a plant, directly or indirectly. Any appropriate plant part can be treated or used including plant organs (e.g., leaves, stems, roots, etc.), seeds, and plant cells and progeny of the same. In the alternative, the compound or composition can be applied to the soil surrounding the plant. The applying of the compound is prior to planting, at planting, or after planting. In one embodiment, contacting includes direct application to a plant. All or part of a plant including, without limitation, leaves, stems, seeds, roots, propagules (e.g., cuttings), fruit, etc., may be contacted with the one or more of the compounds described herein. Contacting may also be carried out indirectly, via application, e.g., to soil or other plant substrates.

Suitable application methods include high or low-pressure spraying, immersion, atomizing, foaming, fogging, coating, and encrusting. Other suitable application procedures can be envisioned by those skilled in the art. In a particular embodiment, the compounds of the invention are applied to the parts of the plant above ground or to the foliage of the plant by spraying e.g. by the use of mechanical sprayers. Sprayers convert a formulation of the invention which is mixed with a liquid carrier, such as water or fertilizer, into droplets. The droplets can be any size. Boom sprayers and air blast sprayers can also be used to apply formulations of the invention to pre-emergent or post-emergent crops. Air blast sprayers inject formulations of the invention mixed with a liquid carrier into a fast-moving air stream. Boom sprayers, aerial sprayers, ultra-low volume sprayers, drip irrigation, sprinkler irrigation, and foggers can also be used to apply formulations of the invention. Where the formulations of the invention are in a solid, powder or granule form, they can be applied with granule or dust application equipment. Formulations of the invention can also be applied to soil, plant media, plants, plant tissues or seeds as a fumigant.

In another embodiment, seeds of a plant are coated with the compound of the invention ("coated seeds"). Any appropriate seed coating method known the skilled person can be used. E.g. seeds can be treated with the compounds of the invention in multiple ways including, without limitation, via spraying or dripping, drenching, or pellet application. Spray and drip treatment can be conducted, for example, by formulating an effective amount of the compound in an agronomical acceptable carrier, typically aqueous in nature, and spraying or dripping the composition onto seed via a continuous treating system (which is calibrated to apply treatment at a predefined rate in proportion to the continuous flow of seed), such as a drum-type of treater. Such methods include those that can advantageously employ relatively small volumes of carrier so as to allow for relatively fast drying of the treated seed. Large volumes of seeds can be efficiently treated. Batch systems, in which a predetermined batch size of seed and signal molecule compositions are delivered into a mixer, can also be employed. Systems and apparatuses for performing these processes are commercially available from numerous suppliers. The present invention also provides a seed coated with one or more of the compounds/composition of the present invention.

In another aspect, the compound or composition can be applied to the soil directly, e.g. by drench application (soil drench). A soil drench applies the compound, optionally mixed with water, to the soil around the base of a plant so that its roots can absorb the compound.

In a specific embodiment, the compounds of the present invention can be applied to a plant as provided herein alone, in combination or in a mixture with other compounds. Suitable other compounds include effective amounts of other agricultural or horticultural chemicals, such as herbicides, insecticides, nematicides, molluscicides, bactericides, acaricides, fungicides, and/or plant growth regulators or fertilizers.

In yet another embodiment the invention provides a method for the manufacture ('or the production of which is equivalent wording) an (agrochemical) composition according to the invention, comprising formulating a compound of the invention, and in particular a molecule of formula I, II, III or IV (including any subgroup and compounds of Table 1) as defined herein before, together with at least one customary agrochemical auxiliary agent. Suitable manufacturing methods are known in the art and include, but are not limited to, high or low shear mixing, wet or dry milling, drip-casting, encapsulating, emulsifying, coating, encrusting, pilling, extrusion granulation, fluid bed granulation, co-extrusion, spray drying, spray chilling, atomization, addition or condensation polymerization, interfacial polymerization, in situ polymerization, coacervation, spray encapsulation, cooling melted dispersions, solvent evaporation, phase separation, solvent extraction, sol-gel polymerization, fluid bed coating, pan coating, melting, passive or active absorption or adsorption. Customary agrochemical auxiliary agents are well-known in the art and include, but are not limited to aqueous or organic solvents, buffering agents, acidifiers, surfactants, wetting agents, spreading agents, tackifiers, stickers, carriers, fillers, thickeners, emulsifiers, dispersants, sequestering agents, anti-settling agents, coalescing agents, rheology modifiers, defoaming agents, photo-protectors, anti-freeze agents, biocides, penetrants, mineral or vegetable oils, pigments and drift control agents or any suitable combination thereof.

The following examples are set forth below to illustrate the methods, compositions, and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

EXAMPLES

Material and Methods
Plant Material
Rice (*Oryza sativa*)
All experiments were performed in the japonica cultivars Nipponbare, Bomba or Kitaake.

Examples 3, 4, 18 and 19 used Bomba, Example 6 used Kitaake and Examples 8 and 15 used Nipponbare. Kitaake, Bomba and mutant seeds were obtained from greenhouse-grown plants grown at the UGent greenhouse at the Flemish Institute for Agriculture and Fisheries Research (ILVO Plant, Melle, Belgium). Wild type Nipponbare seeds were obtained from the Dale Bumpers National Rice Research Center (Stuttgart, United States).

Seeds were germinated on wet tissue paper at 30° C. in the dark for three days, followed by transfer to individual PVC tubes (for nematode infection) containing SAP (Reversat et al., 1999). SAP (sand-absorbent polymer) is a mixture of fine silica sand and ultra-absorbent acrylic copolymer (DCM AquaPerla, DSM, Grobbendonk, Belgium) in a ratio of 1 kg sand to 1.5 g of dry copolymer.

Before use, each tube was washed in soapy water and dried in an oven at 70° C. for two days. The growing tubes were placed inside plastic boxes in a completely randomized manner to minimize environmentally induced bias and transferred to a growth chamber at 28° C. with 16 hours of light. The first two days after transfer, the tubes were covered with a polyethylene film (Saran Film, Dow Chemicals, Midland, USA) to prevent excessive evaporation. Seedlings were watered three times per week with 8 ml of Hoagland solution (Hoagland, 1938).

*Beta vulgaris* (sugar beet)
Sugar beet seeds (*cultivar Jolgeh*) were germinated for five days at 25° C. on sterile potting soil saturated with distilled water. Seedlings were transferred to SAP tubes, which were placed in a growth chamber at 24° C. (16h per day of fluorescent lighting). The first two days after transfer, the tubes were covered with a polyethylene film (Saran Film, Dow Chemicals, Midland, USA) to prevent excessive evaporation. Seedlings were watered three times per week with 8 ml of Hoagland solution.

*Triticum aestivum* (wheat)
For Examples 1, 5 and 10, seeds of the winter wheat cultivar Sahara (Aveve Agrarisch, Landen, Belgium) were used. Seeds were washed in a 10% ethanol solution to remove any residual traces of fungicide and then germinated on wet paper at room temperature for four days; seeds were transferred to SAP tubes and placed in a growth chamber (25° C., 16 hours per day of light). Plants were watered with 8 ml of half-strength Hoagland solution every two days for the first ten days and with 8 ml of full strength Hoagland solution every two days afterwards.

For Example 2, the spring wheat cultivar Fielder was used. Seeds were obtained from plants grown in the greenhouse complex of the VIB (Zwijnaarde, Belgium). Seeds were sown directly in potting soil (four seeds to a pot, thinned to three plants per pot after emergence) and placed in a growth chamber at 21° C. with 16 hours per day of light. These plants were grown until harvest; they were sprayed three times with the compounds of the invention at a concentration of 300 µM using the protocol described in the chemicals section. Spraying took place 14 and 21 days after emergence and a final time at heading.

Tomato (*Solanum lycopersicum*)
Tomato seeds, cv. Moneymaker (Vreeken's Zaden, Dordrecht, the Netherlands) were sown on autoclaved potting soil coveed with polyethylene film and placed at 24° C. for eight days. Seedlings were then transferred to individual SAP-filled pots and placed in a growth chamber at 24° C. Plants were watered three times per week with 25 ml of quarter-strength Hoagland solution for the first two weeks and half-strength thereafter.

Carrot (*Daucus carota*)
Carrot seeds, cv. Nantes 2 (Vreeken's Zaden, Dordrecht, the Netherlands) were germinated on wet paper for seven days at 21° C. After germination, seedlings were transferred to individual pots filled with potting soil and placed in a growth chamber at 21° C.

Nematode Cultures
*Meloidogyne graminicola* Culture
*M. graminicola* was extracted from infected *Echinocloa crus-galli* roots grown in potting soil at 25° C. Roots were washed until most soil was removed, after which they were cut into short fragments (with special care taken to cut open any outwardly visible galls). The cut material was put in 200 µM pore diameter sieves which were put into a tap water bath at room temperature for three days. The water was then poured over a 20 µM mesh sieve. The sieve surface was washed with approximately 50 ml of non-demineralized water, which was collected into a beaker before it could seep through the sieve.

The number of nematodes in five 100 µl samples taken from the nematode suspension was counted under a stereo microscope and averaged to determine inoculum concentration. Each plant (grown per the protocol outlined in the previous section) was then inoculated by injecting the desired number of nematodes in the SAP surrounding the root system using a micro-pipette.

*Meloidogyne incognita* Culture
*M. incognita* was extracted from infected tomato plants (cv. Moneymaker) roots grown in potting soil at 24° C. Nematodes were collected, counted and inoculated using the same procedure described for *M. graminicola* above.

*Heterodera schachtii* Culture

Cysts were collected from sugar beets (cv. Jolgeh) kept in a growing chamber at 21° C. through a flotation protocol. Plant roots and their surrounding soil were placed in a water bath at room temperature and gently agitated, followed by decanting and sieving to allow collection of cysts. Cysts were are-dried for two days and stored until use.

Hatching of cysts was induced by exposing them to a zinc chloride solution (3 mM in distilled water) at 25° C. for three days. Five 100 µl samples were taken from this suspension. The number of J2 juveniles in each sample was counted and the results were averaged. Sugar beet plants were inoculated fourteen days after transfer to SAP with the required volume of suspension to inoculate each plant with an average of 250 J2 nematodes.

*Pratylenchus penetrans* Culture

A pure culture of *P. penetrans* grown on carrot disks was kindly provided by Giuseppi Lucarelli (Horto Service, Noicattaro, Italy). The nematodes were multiplied by inoculating approximately 100 nematodes on a sterilized carrot disk, placing this disk in a sealed petri dish and incubating the dish at 24° C. for six weeks in the dark. Carrots were sterilized by washing and peeling them, then dipping them in ethanol and finally burning the ethanol off in a Bunsen burner.

Fungal Cultures

All fungal isolates were kindly provided by professor Kris Audenaert at Ghent University. Inoculum was obtained by inoculating 20 µl of glycerol spore stock kept in a –80° C. freezer on potato dextrose agar (Sigma-Aldrich) plates. The plates were kept in the dark at room temperature and exposed to UV light for eight hours each day. After ten days, spores were harvested by flooding the plate with 15 ml sterile PBS buffer with 0.01% Tween 20 surfactant and gently scraping off the spores and mycelium. The resulting suspension was filtered through sterile MiraCloth (VWR) and the number of spores per ml was determined through counting in a Burker chamber (Marienfeld). Spores were then diluted or concentrated as required to achieve the desired inoculum density. Spores were concentrated by centrifugation at 4000 rpm followed by removal of the supernatant and replacement with a smaller volume.

Chemicals

Unless otherwise mentioned, all chemicals for nematode experiments were applied as a foliar spray consisting of the target compound at a concentration of 300 µM together with 0.1% (v/v) Tween 20 surfactant (Calbiochem) in distilled water. Again unless otherwise mentioned, all treatments for the nematode experiments were carried out three times: one and eight days before pathogen inoculation and seven days after pathogen inoculation. In all cases, plants were sprayed until run-off with an atomizer.

Most C4H inhibitors as well as LPS were obtained from Sigma-Aldrich (Saint Louis, USA). 3-(4-pyridyl)acrylic acid and 4-propynyloxybenzoic acid were obtained from Enamine (Kiev, Ukraine). All compounds were dissolved in dimethyl sulfoxide (Duchefa Biochemie, Haarlem, the Netherlands) to form a 100 mM stock solution which was then used to make the spray treatments. Control treatments consisted of distilled water with Tween 20 and dimethyl sulfoxide added at the same concentration as in the treatment groups.

Seed coatings were applied by dipping seeds in a coating solution containing 20 g/l high viscosity carboxymethylcellulose (Sigma-Aldrich, Saint Louis, USA) in distilled water as well as 300 µM of the target compound. Seeds were then dried overnight at room temperature.

Nematode Infection Experiments

Infection experiments with *M. graminicola* were performed by inoculating host plants 14 days after transfer to SAP by introducing the desired amount of J2 juveniles next to the root system using a micro pipette. Rice plants (cv. Nipponbare or Kitaake) were inoculated with 250 J2 juveniles per plant; wheat plants (cv. Sahara) were inoculated with 600 J2 juveniles per plant. Plants were harvested 14 days after inoculation. At this point, the plants were phenotyped by measuring the shoot and root length with a ruler, counting the number of adventitious roots and in some experiments by measuring leaf area using the EasyLeafArea software (Easlon and Bloom, 2014) and by determining shoot dry mass after 72 hours of drying in an oven at 70° C. Root systems were then stained in acid fuchsine as described in (Byrd et al., 1983) and left to destain in glycerol with 1 ml/l fuming HCl added for approximately ten days. The number of galls and nematodes was then counted using a binocular microscope.

Infection experiments with *M. incognita* were performed in the same manner as those with *M. graminicola*, except that plants were harvested 31 days after inoculation instead of 14 days. At this point, the plants were phenotyped by measuring the root length with a ruler and in some experiments by measuring leaf area using the EasyLeafArea software (Easlon and Bloom, 2014) and by determining shoot dry mass after 72 hours of drying in an oven at 70° C. Galls were stained and counted as described above.

Infection experiments with *H. schachtii* were performed by inoculating host plants 14 days after transfer to SAP by introducing 250 J2 juveniles to their root system using a micro pipette. Plants were harvested 31 days after inoculation. At this point, the plants were phenotyped by measuring the root and shoot length with a ruler. Cysts were collected through a sucrose flotation protocol and then counted and microscopically assessed for maturity.

Infection experiments with *P. penetrans* were performed by inoculating host plants 14 days after transfer to SAP by introducing 500 nematodes to their root system using a micro pipette. Plants were harvested 31 days after inoculation. At this point, the plants were phenotyped. Lesions were counted manually using a magnifying glass after washing and spreading open the root system. Nematodes were counted by macerating the root systems with a kitchen blender, placing a root system in 30 ml of autoclaved tap water for 24 hours and finally counting the number of nematodes in four 500 µl aliquots from each 30 ml root suspension under a binocular microscope.

Fungal Infection Experiments

*Fusarium*-Onion

Onion seeds were coated with a 300 µM PA solution as outlined in the chemical treatments section. *F. oxysporum* (isolate Foc26), *F. solani* (isolate Fso18) and *F. proliferatum* (isolate Fpr18) were originally extracted from Vietnamese onion fields. Inoculum was obtained as described in the fungal culture section. The inoculum was diluted to a concentration of $1.0 \times 10^7$ spores per ml with sterile PBS buffer. The coated seeds were then soaked in the spore solution for one hour. To avoid excessive PA leaching from the PA coating, 100 µM of PA was added to the spore solution.

After soaking in the PA solution, seeds were left to dry for thirty minutes. Twenty seeds were then sowed per pot in potting soil; three pots were used per treatment and per fungal isolate (for a total of 60 seeds per treatment-isolate combination). The pots were covered in cling film and left on a window sill at room temperature. After eight and ten days, the number of germinated seedlings per pot was counted.

*Botrytis*-Tomato

Tomato plants (cv. Moneymaker) were grown for four weeks in potting soil as described in the plant material section. Six hours before inoculation, the third leaf of each tomato plant was detached. The petioles were wrapped in wet tissue paper and the leaves were placed on a petri dish. The petri dishes with the leaves were then placed in a plastic tray with water so that the leaves did not touch the water. Finally, the tray was covered with a plastic autoclave bag to keep humidity at 100%.

*Botrytis cinerea* (line R16) spores were obtained as described in the fungal culture section, centrifuged for five minutes at 3000 rpm and resuspended to a concentration of $1.0 \times 10^6$ spores per ml with a solution of 0.01 M glucose and 0.0067 M $KH_2PO_4$. The spore suspension was left at room temperature for one hour to trigger germination. At this point, either 10 μM of PA or the equivalent amount of DMSO for the control were added to the spore solution to mimic the final foliar spray that is applied after inoculation in all other experiments.

Six drops of spore suspension of 15 μl each were spotted on each detached tomato leaf, after which the tray was covered again. The tray was placed at room temperature away from direct sunlight and left for four days. At this point, chlorophyll fluorescence measurements were taken to assess the success of infection. Two parameters were assessed: whether the *B. cinerea* lesion had spread beyond the droplet area (successful invasion) and the total surface area of successfully established lesions (post-invasion growth).

Nematode Toxicity Assays

J2 juveniles of *Meloidogyne graminicola* and *Heterodera schachtii* were isolated from *Echinocloa cruss-galli* roots and sugar beet roots respectively. Per treatment and species combination, 300 nematodes were isolated and divided over six wells that contained 1.5 ml of either sterilized tap water, a 100 μM C4H inhibitor solution or a 0.02 v/v % solution of the nematicide abamectin (Vertimec®, Syngenta AG). The nematodes were incubated in the dark on a slow-moving rotary shaker (50 rpm) and the number of living nematodes was counted regularly using a binocular microscope.

Fungal Toxicity Assay

Five microliters of a spore solution (fungal spores in a mixture of 30% glycerol and 70% water, stored at −80° C.) were spotted in the middle of a petri dish containing 25 ml of potato dextrose agar that contained either 300 μM PA or a control solution. Ten plates were used per fungal species (five PA and five control). Each plate was marked with x- and y-axes going through the center of the plate.

Plates were incubated at room temperature. Starting 24 hours after spotting, the surface area of the colony was calculated daily by measuring growth along the x and y axes and applying the formula for the surface area of an ellipse (A=πab). Plates were also visually examined for abnormal phenotypes such as air mycelia or early sporulation.

*Pseudomonas syringae* Infection Experiment

Tomato plants (*Solanum lycopersicum* cv. Moneymaker) were grown in potting soil as described in the plant materials section until the fourth leaf stage. Plants were treated with a piperonylic acid or control spray as described in the chemicals section. Twenty-four hours before inoculation, the tomato plants were placed in a sealed cloche to keep humidity at 100%.

A glycerol stock of *P. syringae* pv. DC3000 kept at −80° C. was spotted on petri dishes containing King's B agar amended with 75 μg/ml rifampicine (Duchefa Biochemie, Haarlem, the Netherlands). The plates were incubated in the dark at 28° C. for one week. At this time point, glass test tubes containing 5 ml of liquid King's B each (without rifampicin) were inoculated with cells from the plates and placed on an orbital shaker at 200 rpm for 24 hours at 28° C. 100 μl of this liquid inoculum was transferred to fresh glass test tubes containing 5 ml of liquid King's B each (without rifampicin), which were placed on an orbital shaker at 200 rpm for 24 hours at 28° C.

At this time point, the liquid culture was diluted with fresh King's B medium to an OD of 1.0. This medium was then centrifuged at 3000 rpm for ten minutes; the supernatant was discarded and the cells were resuspended in 10 mM $MgSO_4$ to an OD of 0.20. To this inoculum, 0.01 v/v % Silwet 77 surfactant was added.

Whole tomato plants were inoculated by briefly dipping them in a beaker of the aforementioned inoculum. After dipping, plants were placed back in the sealed cloche for 12 hours. At this point, the cover was removed and the plants were exposed to the normal humidity level in the growth chamber.

*Pseudomonas syringae* Toxicity Experiment

A glycerol stock of *P. syringae* pv. DC3000 kept at −80° C. was spotted on petri dishes containing King's B agar amended with 75 μg/ml rifampicine (Duchefa Biochemie, Haarlem, the Netherlands). The plates were incubated in the dark at 28° C. for one week. At this time point, glass test tubes containing 5 ml of liquid King's B each (without rifampicin) were inoculated with cells from the plates and placed on an orbital shaker at 200 rpm for 24 hours at 28° C. 100 μl of this liquid inoculum was transferred to fresh glass test tubes containing 5 ml of liquid King's B each (without rifampicin) amended either with 100 μM of PA or a corresponding control, which were placed on an orbital shaker at 200 rpm for 24 hours at 28° C. At this time point, the cells were diluted ten-fold with liquid King's B medium and the OD600 of the resulting suspension was determined using a spectrophotometer (BioRad SmartSpec Plus), with sterile King's B as a blanc.

qRT-PCR (Quantitative Reverse Transcriptase PCR)

Rice plants of the cultivar Bomba were harvested 13 days after germination. Plants were germinated on paper soaked in plain tap water or in a 100 μM MDCA or PA solution. After transfer to SAP, plants were sprayed every two days with MDCA, PA or mock treatment. Each treatment group contained nine plants, which were pooled in three groups of three plants for RNA extraction. As practical constraints prevented analysis of both root and shoot, only root tissue was used.

Samples were frozen in liquid nitrogen before being ground in a frozen pestle-and-mortar treated with RNAse inhibitor. The ground root tissue was suspended in extraction buffer and sonicated three times for 15 seconds, before RNA extraction with a Qiagen RNeasy Plant Mini kit (Qiagen, Venlo, the Netherlands). RNA purity and quantity was measured using a NanoDrop 2000 spectrophotometer (ThermoFisher Scientific, Waltham, USA); if quality was insufficient, the extraction protocol was repeated.

One microgram of total RNA was incubated with DNAse I (ThermoFisher Scientific, Waltham, USA). Total cDNA was generated using a Bioline Tetro cDNA synthesis kit (Meridian Life Sciences, Cincinnati, USA). The quality of the cDNA was tested by performing a PCR reaction with primers for the OsElF5C reference gene.

After quality control, qPCR was carried out. Two reference genes (OsEXP and OsEXPNarsai) were included; each sample was split into two technical replicates. One negative control per gene was also included. qPCR primers were ordered from ThermoFisher Scientific; Bioline SensiMix SYBR was used both as a PCR master mix and as a fluorescent dye. The qPCR reaction was performed on a BioRad CFX Connect system; quality control was performed by melting curve analysis.

Statistical Analysis

All statistical analyses were performed in Microsoft Open R (v. 3.5.0) except for qPCR results which were analyzed using the permutation test implemented in the Rest 2009 software (Pfaffl, Horgan and Dempfle, 2002). All analyses were performed at the $\alpha=0.05$ significance level. Statistical graphics were created using the ggplot2 package (Wickham, 2009).

Short-term phytotoxicity experiments (Example 1) were analyzed using non-parametric methods. For each variable, overall significance was determined using the Kruskal-Wallis test (Kruskal and Wallis, 1952), followed by a post-hoc Conover-Iman test (Conover and Iman, 1981) with Hommel multiplicity correction (Hommel, 1988) if the Kruskal-Wallis test was significant. When only two groups were present, the Wilcoxon-Mann-Whitney test was used (Mann and Whitney, 1947).

Infection experiments, as well as the long-term yield experiment in Example 2, were analyzed using generalized linear models (using a normal distribution for continuous data and ratios such as root length or galls per adventitious root, an overdispersed quasipoisson model for count data such as number of galls and a binomial model for binary data such as lesion spreading or nematode survival). In all cases model assumptions were verified using diagnostic plots (residuals, QQ-plot, scale-location and residuals-leverage). Outliers were removed only if they were outliers both in the statistical sense and if there was a biological reason for removal (e.g. the plant was stunted or developed a secondary infection). The non-parametric methods outlined in the previous paragraph were used for variables that deviated from the requirements for parametric methods based on the aforementioned diagnostic plots.

In addition to linear models, post-hoc tests were also used to obtain pairwise comparisons. For all-vs-control analyses Dunnett's test (Dunnett, 1955) was used, for all-vs-all comparisons Tukey's test (Bretz, Hothorn and Westfall, 2011) was used. BBCH development stage was analyzed non-parametrically using the Kruskal-Wallis test and Conover-Iman posthoc test with Hommel multiplicity correction.

Growth curves constructed while the experiment was ongoing were generated through linear mixed models as implemented in the R nlme package (Pinheiro et al., 2017). Model assumptions were verified using three diagnostic plots: a QQ-plot, a studentized residual plot and a leverage plot. In order to account for autocorrelation between time points, different correlation structures were tested and chosen based on the AIC criterion. Two types of model were considered: polynomial splines or cubic regression splines (via the bs function in base R). For splines regression, the optimal number of knots was determined by AIC. The final model was always fitted using REML, but ML was used for the initial AIC-based model selection as recommended (Zuur et al., 2009).

Germination experiments were analyzed by fitting a three-parameter log-logistic model as implemented in the R drc package.

The qPCR data in example 5 was analysed using Pfaffl's method and a permutation test of statistical significance as implemented in the REST 2009 software (Pfaffl, Horgan and Dempfle, 2002).

Example 1

Effect of C4H Inhibition on Growth and Development in Uninfected Crops

To test whether C4H inhibitors induce phytotoxic effects in crops, uninfected tomato, wheat and carrot were treated with piperonylic acid (PA), 4-iodobenzoic acid (4-IBA) and piperic acid (PIA) at a concentration of 500 µM through foliar application. At harvest, leaf area (or shoot length in the case of wheat) and primary root length were recorded. The BBCH developmental stage (Lancashire et al., 1991), a measure of developmental retardation, was used to test for effects on development. Finally, the presence of visible signs of phytotoxicity such as chlorosis, discoloration or necrosis was recorded.

None of the tested compounds caused any effects on growth or development compared to the control treatment in either of the tested crops. The data is summarized in Table 2, Table 3 and Table 4.

TABLE 2 mean leaf area with standard deviation and median BBCH development stage with interquartile range for carrot and tomato after treatment with a 500 µM PA, 4-IBA or PIA foliar spray. Sample size: 8 plants per treatment.

| Crop | Treatment | Leaf Area (cm$^2$) | BBCH stage |
|---|---|---|---|
| Tomato | Control | 9.17 ± 1.22 | 102 ± 0 |
| | PA | 11.83 ± 1.70 | 102 ± 1.0 |
| | | p = 0.8900 | p = 0.677 |
| | 4-IBA | 8.92 ± 1.91 | 102.5 ± 1.0 |
| | | p = 0.8900 | p = 0.677 |
| | PIA | 12.21 ± 1.66 | 103 ± 1.0 |
| | | p = 0.4600 | p = 0.677 |
| Carrot | Control | 5.65 ± 1.64 | 13 ± 0 |
| | PA | 6.07 ± 2.12 | 13 ± 0 |
| | | p = 0.8400 | p = 1.000 |
| | 4-IBA | 5.05 ± 1.35 | 13 ± 0 |
| | | p = 0.3500 | p = 1.000 |
| | PIA | 4.78 ± 0.85 | 13 ± 0 |
| | | p = 0.2300 | p = 1.000 |

TABLE 3 mean shoot length with standard deviation and median BBCH development stage with interquartile range for wheat after treatment with a 500 µM PA, 4-IBA or PIA foliar spray. Sample size: 8 plants per treatment.

| Crop | Treatment | Shoot length (cm) | BBCH stage |
|---|---|---|---|
| Wheat | Control | 30.25 ± 5.43 | 13 ± 0 |
| | PA | 31.75 ± 2.84 | 13 ± 0 |
| | | p = 1.000 | p = 1.000 |
| | 4-IBA | 31.93 ± 3.38 | 13 ± 0 |
| | | p = 1.000 | p = 1.000 |
| | PIA | 31.07 ± 4.82 | 13 ± 0 |
| | | p = 1.000 | p = 1.000 |

TABLE 4 mean root system length with standard deviation in wheat and tomato after treatment with a 500 μM PA, 4-IBA or PIA foliar spray. Sample size: 8 plants per treatment.

| Crop | Treatment | Root length (cm) |
|---|---|---|
| Tomato | Control | 8.82 ± 0.83 |
| | PA | 7.95 ± 1.83 |
| | | p = 0.8500 |
| | 4-IBA | 7.40 ± 0.79 |
| | | p = 0.3200 |
| | PIA | 8.24 ± 1.90 |
| | | p = 0.3800 |
| Wheat | Control | 12.67 ± 5.13 |
| | PA | 15.75 ± 2.64 |
| | | p = 0.7200 |
| | 4-IBA | 14.36 ± 2.78 |
| | | p = 0.7200 |
| | PIA | 14.57 ± 1.24 |
| | | p = 0.7200 |

These results demonstrate that the compounds are well-tolerated by the plant at biologically relevant concentrations and do not cause adverse effects on vegetative growth.

Example 2

C4H Inhibitors have No Effect on Yield and Fertility in Wheat

To determine the effects of C4H inhibition on yield and fertility, spring wheat (*Triticum aestivum* cv. Fielder) was grown in a pathogen-free growth chamber until maturity and treated with a control or C4H inhibitor-containing foliar spray at regular intervals. At harvest, the number of ears per plant, the seed mass, the size of the seeds and the germination ability of the freshly harvested seeds were measured. Seed size was measured using the stacking density of the seed as a proxy measure; if a given seed mass takes up a greater volume, then the individual seeds must be larger.

Although not explicitly measured, there was no visible difference in heading date or anthesis between any of the three treatments. Similarly, the mean number of ears per plant was the same in all treatments (PA vs. control: p=0.738; piperine vs. control: p=0.208).

Figure 2:
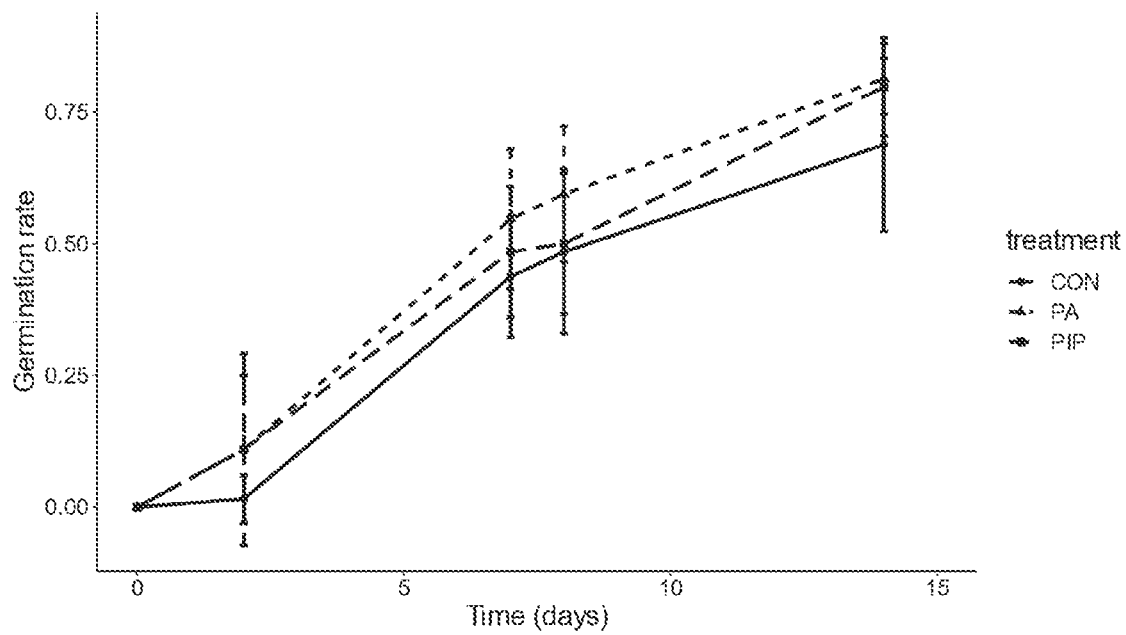
FIG. 2: germination rate of wheat seeds from plants treated with piperonylic acid (PA), piperine (PIP) or a control treatment (CON) on wet paper at room temperature, with error bars indicating standard deviation. N=64 (eight seeds per pot, eight pots per treatment).

There was also no effect on seed size (PA vs. control: p=0.362; piperine vs. control: p=0.766). Total yield (seed mass) was not significantly different after PA treatment (p=0.08812), but piperine resulted in a small but statistically significant increase in seed mass per plant (p=0.00107). Finally, germination after fourteen days was not significantly different in any treatment (PA vs. control: p=0.1004; piperine vs. control: p=0.1643). The results of this experiment are summarized in FIG. 1 and FIG. 2.

Example 3

The Early Phenylpropanoid Pathway and Rice Defense

Testing the Effect of MDCA and PA on Rice Defense Against Nematodes

Figure 3:
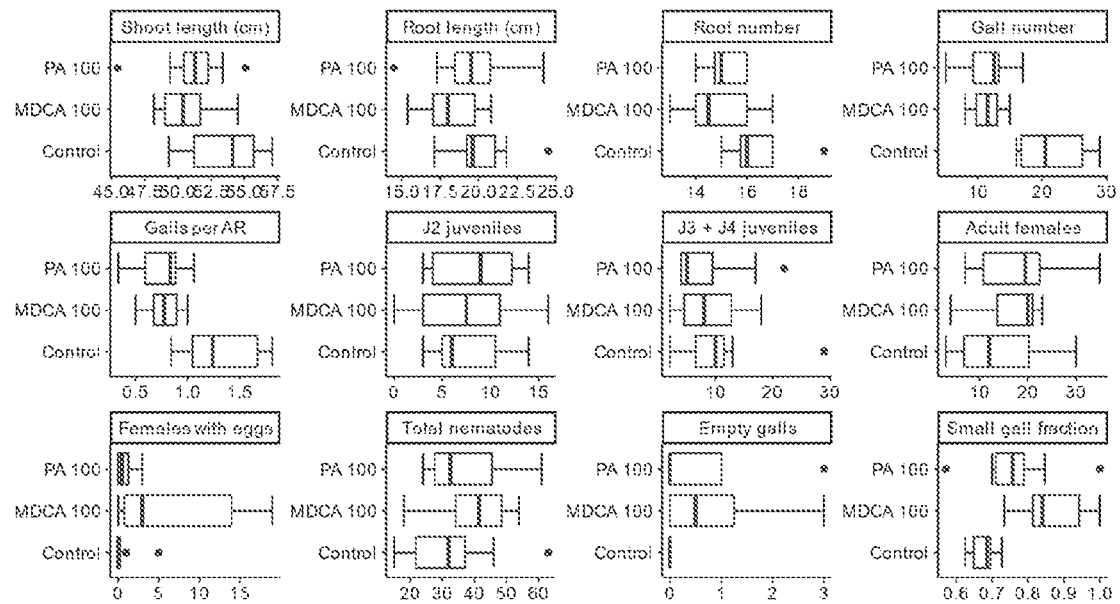
FIG. 3: box plots of phenotypic traits in rice plants treated with 100 μM of piperonylic acid (PA 100), 100 μM of 3,4-methylenedioxycinnamic acid (MDCA 100) or a control treatment (Control), with dots indicating outliers. Sample size=24 (8 individuals per treatment). J2 indicates second-stage juveniles, J3+J4 is the sum of third and fourth stage juveniles (visually distinguishing J3 and J4 is nearly impossible). Adult females are mature females without egg masses, egg laying females are mature females with egg masses. Non-empty galls were classified as small, medium, large or very large; percentage of small galls is the proportion of small galls. AR: adventitious root

Rice plants were germinated for three days, transferred to SAP and grown for twelve days. After twelve days, 240 *M. graminicola* J2 nematodes on average were added to each plant. Plants were harvested twelve days after infection and roots were stained with acid fuchsine to visualize galls and nematodes. Results are shown in Table 5 and FIG. 3.

TABLE 5 median values and interquartile ranges for various phenotypic traits (shoot length, root length, number of adventitious roots, number of galls per root system, number of galls per adventitious root, number of J2 juveniles, number of J3/J4 juveniles, number of adult females with and without eggs, total number of nematodes, number of empty galls and small galls as a fraction of the total gall number). No post-hoc p-values are given when the omnibus test was not significant.

| | Control (n = 8) | MDCA 100 μM (n = 8) | PA 100 μM (n = 8) |
|---|---|---|---|
| Shoot length (cm) | 54.1 (IQR = 4.5) | 50.4 (IQR = 2.7) | 51.3 (IQR = 1.8) |
| | | p = 0.0921 | p = 0.4459 |
| Root length (cm) | 19.6 (IQR = 1.8) | 18.0 (IQR = 2.7) | 19.5 (IQR = 2.3) |
| | | p = 0.4605 | p = 0.8226 |
| Root number | 15.0 (IQR = 1.3) | 13.5 (IQR = 2.0) | 14.0 (IQR = 1.3) |
| | | p = 0.0479 | p = 0.1329 |
| Gall number | 20.5 (IQR = 9.5) | 11.5 (IQR = 3.3) | 12.5 (IQR = 4.0) |
| | | p < 0.0001 | p < 0.0001 |
| Galls per AR | 1.24 (IQR = 0.62) | 0.78 (IQR = 0.22) | 0.83 (IQR = 0.29) |
| | | p = 0.0380 | p = 0.0480 |
| Number of J2 | 6.0 (IQR = 5.5) | 7.5 (IQR = 8.0) | 9.0 (IQR = 8.3) |
| Number of J3 + J4 | 10.0 (IQR = 5.0) | 8.0 (IQR = 8.3) | 5.0 (IQR = 5.5) |
| | | p = 0.7470 | p = 0.7400 |
| Number of adults (without eggs) | 12.0 (IQR = 13.5) | 20.0 (IQR = 7.3) | 19.5 (IQR = 11.8) |
| | | p = 0.8200 | p = 0.8200 |
| Number of adults (with eggs) | 0.0 (IQR = 0.3) | 3.0 (IQR = 13.3) | 0.5 (IQR = 1.3) |
| | | p = 0.1060 | p = 0.6140 |
| Total nematodes | 32.0 (IQR = 15.3) | 41.5 (IQR = 14.3) | 32.5 (IQR = 17.8) |
| | | p = 0.6660 | p = 0.7208 |
| Empty galls | 0.0 (IQR = 0.0) | 0.5 (IQR = 1.3) | 0.0 (IQR = 1.0) |
| Fraction of small galls | 0.69 (IQR = 0.05) | 0.84 (IQR = 0.13) | 0.76 (IQR = 0.08) |
| | | p = 0.0002 | p = 0.0858 |

Abbreviations: AR = adventitious root, J2 = second juvenile stage, J3/J4 = third/fourth juvenile stage.

Before infection, the MDCA, and PA treated plants appeared to have a shorter shoot than the control group. However, MDCA and PA caught up with the control group after nematode inoculation, and their length was not significantly different from the control at the end of the experiment.

The MDCA/PA-treated groups showed evidence of enhanced defense. First and foremost, gall count was significantly reduced, both in absolute numbers and on a per-root basis. Additionally, both groups hosted empty galls, which were occasionally surrounded by necrotized tissue. Inside the root, there were also necrotic patches that appeared to be nematodes that died during migration. This apparent hypersensitive response was not seen in the control.

However, the lower gall number did not seem to hamper nematode development in any treatment group. Neither the total nematode number nor the share of nematodes that reached maturity differed significantly between treated plants and the control group. Despite the MDCA/PA-treated plants hosting fewer and smaller galls, each gall was thus on average populated by a greater number of nematodes than in the control group.

Despite the similar number of nematodes, MDCA and PA do appear to reduce nematode damage. While MDCA and PA reduce shoot size in uninfected plants, plants treated with these compounds appear to catch up with the control group under nematode infection.

Figure 4:
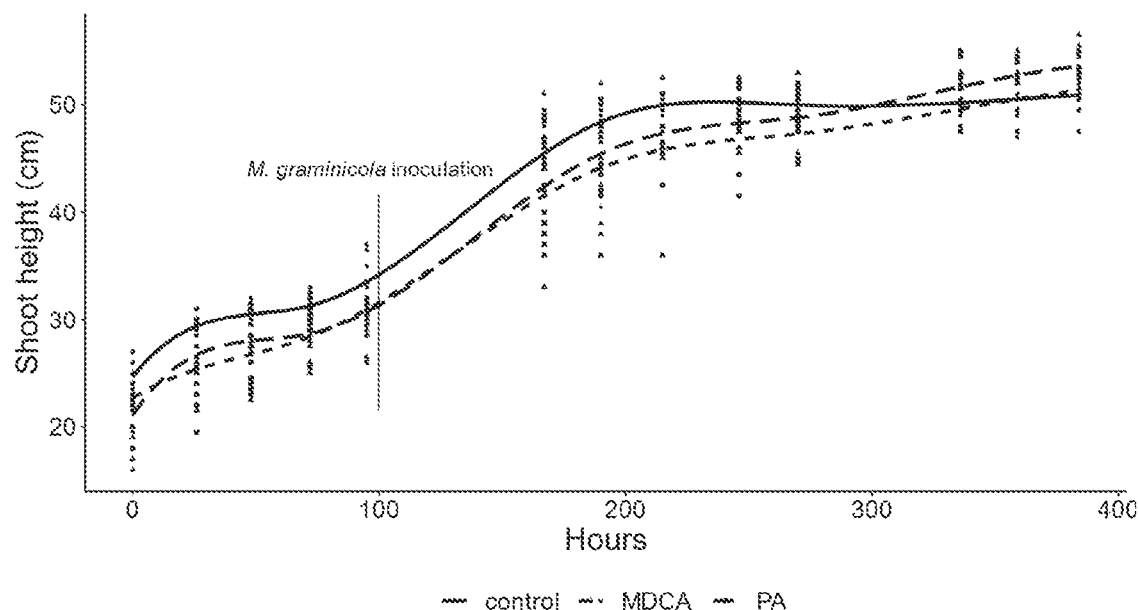
FIG. 4: cubic spline mixed model (4 knots) of the growth of *M. graminicola*-infected rice plants treated with PA, MDCA or mock treatment. Left panel: subject-level regression curves. Right panel: population-level model predictions. Hour 0 corresponds to the start of measurement (10 days after transfer to the growth substrate); *M. graminicola* inoculation occurred at 82 hours. Sample size: 29 (control: 10, PA: 10, MDCA: 9). The moment of inoculation is indicated with a vertical black bar.

Starting ten days after transfer to SAP, plant height and BBCH developmental stage were assessed daily and a growth curve was constructed using non-parametric cubic regression splines (Poirier, 1973). The optimal model was found to have four knots and showed three distinct regions (FIG. 4). In the first region, roughly equivalent to the first 140 hours after the start of measurements, the MDCA/PA-treated plants were slightly but statistically significantly smaller ($p=0.011$ and $p=0.003$ respectively). In the second region, no group was significantly taller than the other (PA: $p=0.891$; MDCA: $p=0.237$). In the final region, equivalent to the final 140 hours, the MDCA/PA-treated groups were significantly taller than the control (PA: $p=0.043$; MDCA: $p=0.039$).

Figure 5:
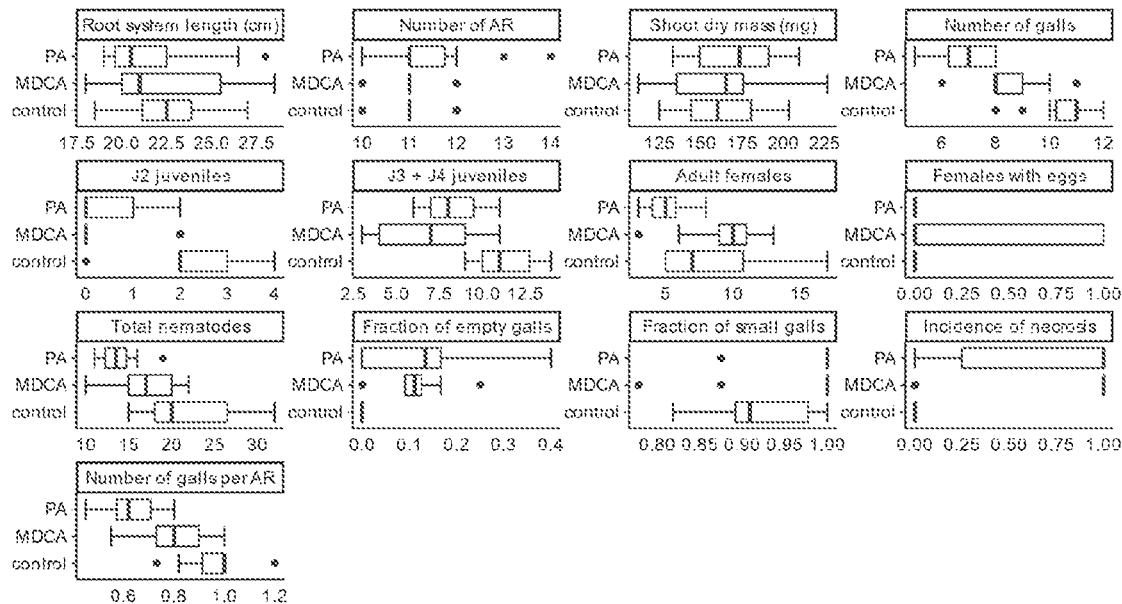
FIG. 5: box plots of phenotypic traits in rice infected with *Meloidogyne graminicola*, with dots indicating outliers. Sample size=29 (control: 10, PA: 10, MDCA: 9). J2 indicates second-stage juveniles, J3+J4 is the sum of third and fourth stage juveniles. Adult females are mature females without egg masses, egg laying females are mature females with egg masses. Non-empty galls were classified as small, medium, large or very large; percentage of small galls is the proportion of small galls. 'AR' stands for adventitious root.

There was never any significant difference in BBCH scale between groups, thus showing that MDCA and PA positively affect growth—but not development—of the rice plant under nematode-infected conditions. After harvest at 13 days after infection, the same phenotypic parameters assessed in the previous experiment were measured (see Table 6 and FIG. 5).

TABLE 6 median values and interquartile ranges for various phenotypic traits. CWR (cell wall residue) is the ratio of cell wall mass to total dry mass (in %).

|  | Control (n = 10) | MDCA 100 μM (n = 9) | PA 100 μM (n = 10) |
| --- | --- | --- | --- |
| Shoot length (cm) | 51.0 (IQR = 2.6) | 53.5 (IQR = 1.5) p = 0.0062 | 53.0 (IQR = 0.5) p = 0.0377 |
| Root length (cm) | 22.5 (IQR = 2.8) | 21.0 (IQR = 5.5) | 20.5 (IQR = 3.0) |
| Root number | 11.0 (IQR = 0.0) | 11.0 (IQR = 0.0) | 11.0 (IQR = 1.0) |
| Shoot dry weight (mg) | 160.1 (IQR = 36.3) | 165.4 (IQR = 40.1) | 173.55 (IQR = 41.8) |
| Shoot CWR (%) | 0.66 (IQR = 0.02) | 0.65 (IQR = 0.03) | 0.64 (IQR = 0.03) |
| Gall number | 11.0 (IQR = 0.8) | 8.0 (IQR = 1.0) p = <0.0001 | 7.0 (IQR = 1.8) p < 0.0001 |
| Galls per adventitious root | 1.00 (IQR = 0.09) | 0.80 (IQR = 0.17) p < 0.0001 | 0.62 (IQR = 0.13) p < 0.0001 |
| Number of J2 | 2.0 (IQR = 1.0) | 0.0 (IQR = 0.0) p = 0.010 | 0.0 (IQR = 1.0) p = 0.015 |
| Number of J3 + J4 | 11.0 (IQR = 2.8) | 7.0 (IQR = 5.0) p = 0.0002 | 8.0 (IQR = 2.5) p = 0.0014 |
| Number of adults (without eggs) | 7.0 (IQR = 5.8) | 10.0 (IQR = 2.0) p = 0.6388 | 5.0 (IQR = 1.8) p = 0.0183 |
| Number of adults (with eggs) | 0.0 (IQR = 0.0) | 0.0 (IQR = 1.0) p = 0.183 | 0.0 (IQR = 0.0) p = 1.000 |
| Total nematodes | 20.0 (IQR = 8.5) | 17.0 (IQR = 5.0) p < 0.0001 | 13.5 (IQR = 2.5) p < 0.0001 |
| Fraction of empty galls | 0.00 (IQR = 0.00) | 0.11 (IQR = 0.03) p = 0.0022 | 0.13 (IQR = 0.17) p = 0.0032 |
| Likelihood of necrosis | 0.00 ± 0.00 | 0.78 ± 0.44 p = 0.0030 | 0.70 ± 0.48 p = 0.0090 |

Example 4

Second Infection Experiment in Rice

The second experiment was methodologically similar to the first. This time, plants were grown for 15 days before inoculation with 210 nematodes on average and harvested 13 days after inoculation.

In the previous experiment, it was noted that the MDCA and PA-treated plants were smaller prior to infection but caught up afterwards. In this experiment, a growth curve was used to test this hypothesis more formally.

As already indicated by the growth curves, infected MDCA or PA-treated plants had a significantly taller shoot than the infected control-treated plants. Interestingly, the root system showed fewer differences: neither its length nor the number of adventitious roots differed between treatments. Root length was also independent of shoot length (Spearman correlation coefficient=0.06).

Shoot dry mass did not differ significantly between groups, although the PA and MDCA-treated, infected groups showed a higher dry mass than the control-treated, infected group. This measurement has a high technical error, so significant differences are difficult to obtain with small sample sizes. Cell wall mass as a percentage of total shoot dry weight also did not differ significantly between any of the treatment groups.

Both the absolute number of galls and number of galls per adventitious root are significantly reduced in the MDCA/PA-treated plants. Compared to untreated controls, the median number of galls was 36% lower in the PA-treated group and 28% lower in the MDCA-treated group. MDCA/PA-treated plants host significantly fewer nematodes in total, but the median number of nematodes per gall is unaffected.

Comparing nematode numbers in each developmental stage is difficult as results are mixed and the technical error is relatively high. However, MDCA/PA appear to reduce the number of juveniles far more than the number of adults. This would suggest that the compounds inhibit invasion and gall establishment rather than development, in accordance with the previous experiment.

Finally, the percentage of empty galls was significantly higher after MDCA/PA treatment. The control group hosted no empty galls. By contrast, roughly one in ten galls were empty in MDCA/PA-treated plants. To verify that a suspected empty gall was truly empty, it was cut open with a scalpel. These empty galls were strongly associated with necrosis. Necrosis was present in roughly 75% of MDCA/PA-treated plants, but was absent in control plants. The extent of the necrosis varied greatly between plants and between individual roots. It was generally most extensive near empty or very small galls, but was also seen far away from galls as isolated spots. Several of these spots appeared to surround deceased invading J2 nematodes, but necrotic spots also occurred in areas with no visible nematode presence.

Example 5

CH4 Inhibition in Wheat Against Root-Knot Nematodes

In this experiment, the compounds PA, MDCA and 4-IBA were tested as foliar spray in the monocot staple crop wheat (*Triticum aestivum*, cv. Sahara) against the nematode *Meloidogyne graminicola*. The bacterial compound LPS (lipopolysaccharide), which is a potent inducer of the plant immune system and a known priming agent (Desaki et al., 2006), was also included as a positive control.

Figure 6:
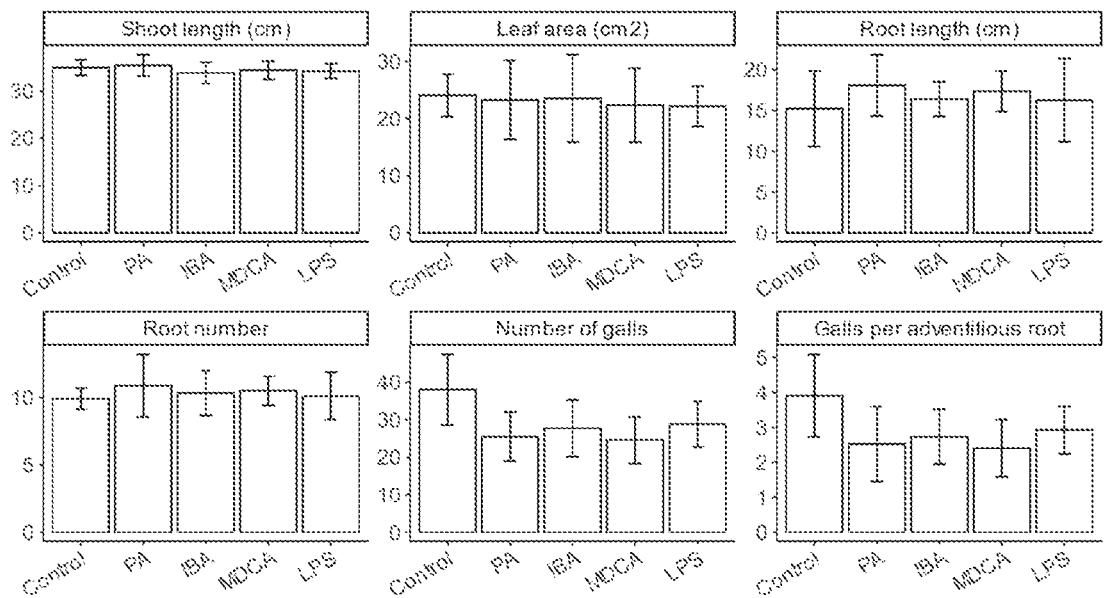
FIG. 6: effect of piperonylic acid (PA), 4-iodobenzoic acid (IBA) and 3,4-methylenedioxycinnamic acid (MDCA) as well as the defense elicitor lipopolysaccharide (LPS) in wheat on shoot length, leaf area, root length, number of adventitious roots and number of *M. graminicola* galls per root system and per root compared to a control group (Control). Bars show mean values; error bars indicate standard deviation. N=9.

The results of the experiment are summarized in Table 7 and FIG. 6. PA, MDCA, 4-IBA and LPS all resulted in a reduction in the number of galls, although for LPS the reduction was not statistically significant either in absolute numbers and normalized against the number of roots.

TABLE 7 summary of various phenotypic traits in plants treated with the C4H inhibitors piperonylic acid (PA), 3,4-methylenedioxycinnamic acid (MDCA), 4-iodobenzoic acid (4-IBA), the elicitor lipopolysaccharide (LPS) or a control treatment. 'AR' stands for 'adventitious root'.

|  | Control (n = 9) | PA (n = 9) | MDCA (n = 9) | 4-IBA (n = 9) | LPS (n = 9) |
|---|---|---|---|---|---|
| Shoot length (cm) | 34.9 ± 1.7 | 35.4 ± 2.2 p = 0.988 | 34.4 ± 1.9 p = 0.983 | 33.8 ± 2.2 p = 0.743 | 34.2 ± 1.5 p = 0.932 |
| Leaf area (cm2) | 24.0 ± 3.7 | 23.3 ± 6.9 p = 0.999 | 22.3 ± 6.5 p = 0.976 | 23.5 ± 7.6 p = 1.000 | 22.1 ± 3.5 p = 0.957 |
| BBCH stage | 22.7 ± 1.0 | 22.8 ± 0.4 p = 0.960 | 23.0 ± 0.0 p = 0.960 | 22.8 ± 0.4 p = 0.960 | 22.7 ± 0.5 p = 0.960 |
| Root length (cm) | 15.2 ± 4.6 | 18.0 ± 3.7 p = 0.525 | 17.4 ± 2.5 p = 0.776 | 16.4 ± 2.1 p = 0.965 | 16.3 ± 5.1 p = 0.977 |
| Number of AR | 9.9 ± 0.8 | 10.9 ± 2.3 p = 0.688 | 10.3 ± 1.7 p = 0.936 | 10.5 ± 1.1 p = 0.977 | 10.1 ± 1.8 p = 0.998 |
| Number of galls | 38.1 ± 9.4 | 25.6 ± 6.5 p = 0.007 | 24.6 ± 6.3 p = 0.004 | 27.8 ± 7.5 p = 0.036 | 28.9 ± 6.1 p = 0.076 |
| Number of galls per AR | 3.9 ± 1.2 | 2.5 ± 1.1 p = 0.023 | 2.4 ± 0.8 p = 0.015 | 2.7 ± 0.8 p = 0.073 | 2.9 ± 0.7 p = 0.180 |

In accordance with previous experiments in rice, the wheat experiment again shows a significant reduction in gall numbers after treatment with C4H inhibitors (−33% for PA, −35% for MDCA and −27% for 4-IBA). Once again, no negative effects on growth or development of the wheat occurred. This experiment demonstrates the applicability of C4H inhibitors in wheat and provides again evidence that all three compounds are effective against nematodes when applied as a foliar spray.

Example 6

Testing Additional C4H Inhibitors Against *Meloidogyne graminicola* in Rice (*Oryza sativa* cv. Kitaake)

In this example, the ability of foliar sprays of C4H inhibitors to control the root-knot nematode *Meloidogyne graminicola* in rice (cv. Kitaake) was demonstrated. Four different C4H inhibitors were used: piperonylic acid (PA), piperine (PIP), 4-propynyloxybenzoic acid (4PB) and 3-(4-pyridyl)acrylic acid (3PA).

Figure 7:
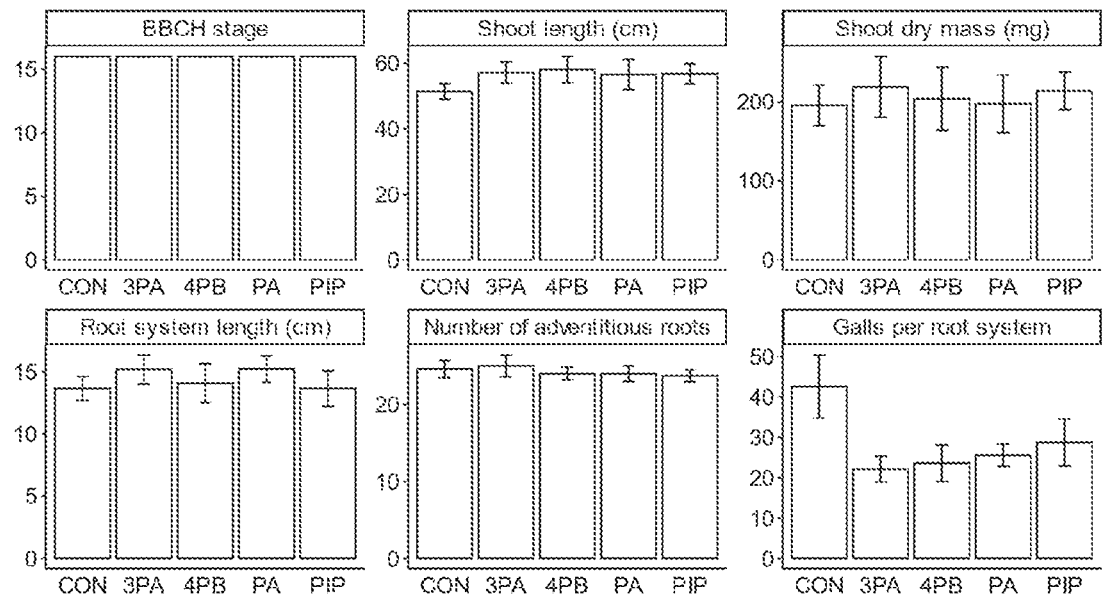
FIG. 7: effect of piperonylic acid (PA), piperine (PIP), 4-propynyloxybenzoic acid (4PB) and 3-(4-pyridyl)acrylic acid (3PA) in rice on developmental stage, shoot and root growth and number of *M. graminicola* galls per root system compared to a control group (CON). Bars show mean values, error bars indicate standard deviation. N=8.

All tested compounds resulted in a significant reduction in the number of galls compared to the control group (PA: −40%, p<0.0001; 4PB: −44%, p<0.0001; 3PA: −47%, p<0.0001; PIP: −33%, p=0.00013). None of the tested compounds showed any phytotoxicity: there were no significant differences between treatments in terms of development, shoot mass or root system size. There were also no signs of chlorosis or other adverse reactions in any treatment group. The results of the experiment are summarized in FIG. 7.

Example 7

C4H Inhibitors Reduce *Meloidogyne incognita* Disease Pressure in Tomato (*Solanum lycopersicum* cv. Moneymaker)

In this experiment, the ability of a foliar spray of the C4H inhibitor piperonylic acid (PA) to control the root-knot nematode *Meloidogyne incognita* in tomato (*Solanum lycopersicum* cv. Moneymaker) was demonstrated. Additionally, a possible dose response effect was investigated by applying PA at three concentrations: 100, 400 and 700 µM.

Figure 8:
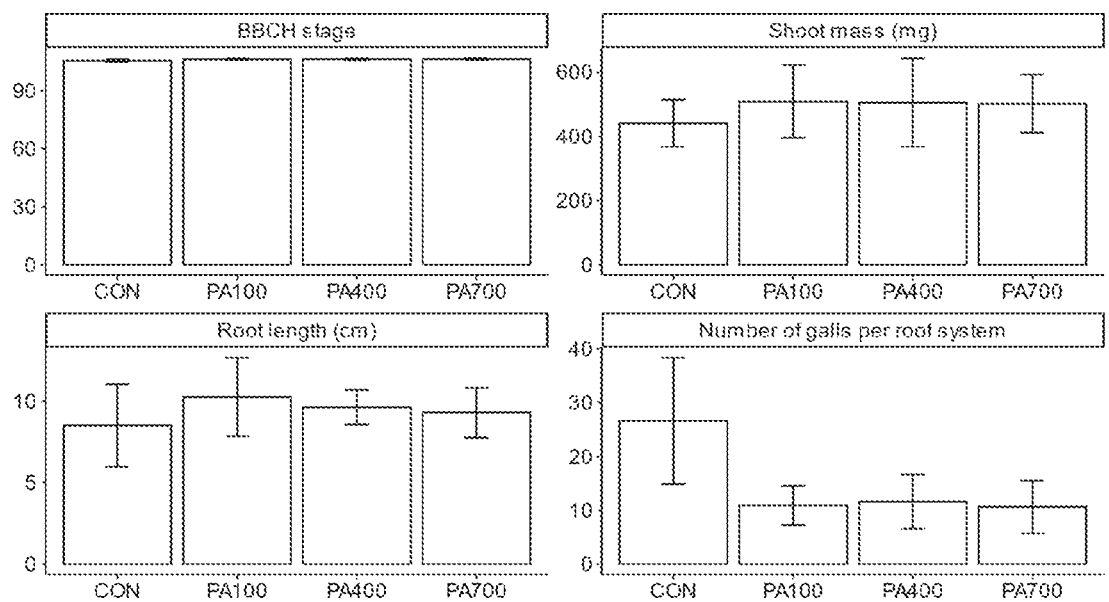
FIG. 8: effect of piperonylic acid at concentrations of 100, 400 and 700 μM (PA100, PA400 and PA700 respectively) on BBCH development stage, shoot dry mass, primary root length and number of galls per root system compared to a control (CON). Bars show mean values; error bars indicate standard deviation. N=8.

The results of the experiment are summarized in FIG. 8 and Table 8. PA resulted in a significant reduction in the number of galls per root system at all concentrations; there was no significant difference between concentrations. As in rice and wheat, no negative effects on growth or development of the tomato plants were observed.

TABLE 8 pairwise comparisons of mean number of galls per root system by treatment, with p-values according to Tukey's post-hoc test.

| Comparison | Percent difference | p-value |
|---|---|---|
| PA100 vs. CON | −54% | 0.00575 |
| PA400 vs. CON | −50% | 0.01478 |
| PA700 vs. CON | −55% | 0.00482 |
| PA100 vs. PA400 | −9% | 0.99212 |
| PA100 vs. PA700 | −2% | 0.99985 |
| PA400 vs. PA700 | +11% | 0.98473 |

Example 8

Testing Different Application Regimens for C4H Inhibitors

Four application regimes for PA on the rice-*Meloidogyne graminicola* interaction were compared: a seed coating treatment, a single high-dose foliar spray prior to infection, a single high-dose foliar spray after infection and repeated lower-dose foliar sprays throughout the growing period. All four treatments were shown to offer a comparable level of protection. This demonstrates the practicality of using C4H inhibitors in different agricultural production systems.

One hundred rice seeds (cv. Nipponbare) were randomly divided into five groups of twenty seeds: a control group, seeds that were coated with carboxymethylcellulose containing 300 µM PA (PA coating), a group that would be foliarly sprayed with 100 µM PA solution three times per week (PA continuous), a group that would be sprayed once with a 300 µM PA solution one day prior to nematode inoculation (PA−1 dpi) and a group that would be sprayed once with a 300 µM PA solution seven days after nematode inoculation (PA+7 dpi).

The experiment was carried out as per the materials and methods described in Materials and Methods, sections *Oryza sativa* (rice) and *Meloidogyne graminicola* culture.

Figure 9:
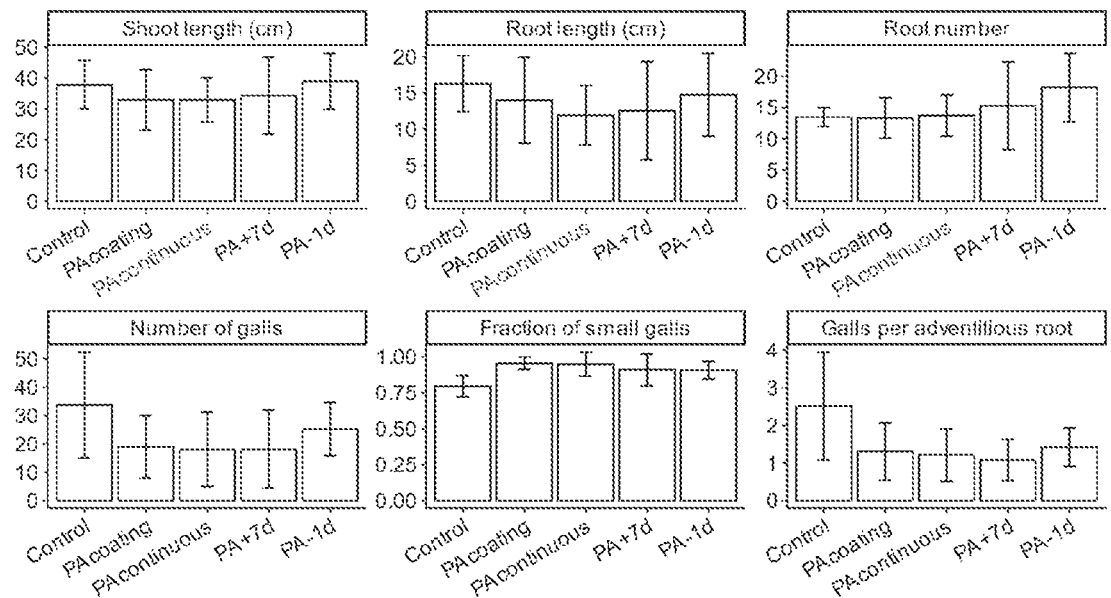
FIG. 9: effect of different application routes of piperonylic acid (PA) on *M. graminicola* infection in rice: a carboxymethylcellulose seed coating containing 300 μM of piperonylic acid (PA coating), 100 μM foliar sprays repeated three times per week (PA continuous), a single 300 μM foliar spray one day before inoculation (PA-1d), a single 300 μM foliar spray after seven days (PA+7 d) or a control (Control). Bars show mean values; error bars indicate standard deviation. N=8.

The results of the experiment are summarized in Table 9 and FIG. 9. All four treatments reduced the mean number of galls both in absolute terms and normalized on a per-root basis, although the difference is not always statistically significant due to the fairly small sample size used (control: n=8; PA continuous: n=9; PA−1 dpi: n=8; PA+7 dpi: n=8; PA coating: n=7). While ten seedlings were transferred to the growing tubes in all groups, all groups experienced some mortality shortly after transfer to SAP. To ensure representative results, it was decided not to replace those seedlings after the experiment had started.

All treatments reduced the number of galls, which is a good proxy for disease severity. Additionally, all treatments resulted in a higher percentage of galls classified as 'small' (as opposed to 'medium' or 'large'). None of the treatments had any effect on plant development (as evidenced by the BBCH score) nor on shoot growth (as evidenced by shoot length).

TABLE 9 summary of phenotypic traits. 'AR' stands for 'adventitious root'. Treatments: 'PA continuous' are plants that were sprayed three times a week with a 100 µM PA solution, 'PA −1 dpi' refers to plants sprayed once with a 300 µM PA solution, one day before inoculation. 'PA +7 dpi' are plants that were sprayed once with a 300 µM PA solution, seven days after inoculation. 'PA coating' refers to seeds that were coated with a carboxymethylcellulose solution containing 300 µM PA. 'Fraction of small galls' refers to the proportion of galls that were classified as 'small' by comparing them against a series of reference dots.

| | Control (n = 8) | PA continuous (n = 9) | PA −1 dpi (n = 8) | PA +7 dpi (n = 8) | PA coating (n = 7) |
|---|---|---|---|---|---|
| Shoot length (cm) | 37.9 ± 7.9 | 32.9 ± 7.2 p = 0.650 | 39.0 ± 9.2 p = 0.998 | 34.3 ± 12.5 p = 0.876 | 32.9 ± 9.8 p = 0.728 |
| BBCH stage | 15.8 ± 0.5 | 15.6 ± 0.5 p = 1.000 | 15.8 ± 0.7 p = 1.000 | 15.6 ± 0.5 p = 1.000 | 15.8 ± 0.5 p = 0.840 |
| Root length (cm) | 16.3 ± 3.9 | 11.9 ± 4.1 p = 0.286 | 14.8 ± 5.7 p = 0.946 | 12.5 ± 6.8 p = 0.466 | 14.0 ± 5.9 p = 0.650 |
| Number of AR | 13.5 ± 1.5 | 13.8 ± 3.3 p = 1.000 | 18.3 ± 5.5 p = 0.131 | 15.3 ± 7.0 p = 0.860 | 13.3 ± 3.2 p = 1.000 |
| Number of galls | 33.8 ± 18.6 | 18.1 ± 13.1 p = 0.021 | 25.3 ± 9.4 p = 0.494 | 18.1 ± 13.6 p = 0.079 | 19.0 ± 11.0 p = 0.391 |
| Number of galls per AR | 2.5 ± 1.4 | 1.2 ± 0.7 p = 0.014 | 1.4 ± 0.5 p = 0.056 | 1.1 ± 0.6 p = 0.011 | 1.3 ± 0.8 p = 0.048 |
| Fraction of small galls | 0.80 ± 0.07 | 0.95 ± 0.08 p = 0.001 | 0.91 ± 0.06 p = 0.030 | 0.91 ± 0.11 p = 0.031 | 0.96 ± 0.04 p = 0.003 |

All treatments appeared to have a beneficial effect on both the number and size of galls, in accordance with the previous results. It is particularly surprising that treatment seven days after inoculation is still effective. Such a curative effect greatly facilitates using these compounds in practice, as nematode issues are sometimes diagnosed long after infection has taken place.

A higher mortality was seen in seeds coated with PA (four of ten versus two out of ten in the control group), but the difference is not statistically significant as per a chi-square test with Yates' correction (p=0.626). Repeat experiments in other crops confirmed that there is no added mortality after a PA seed coating (data not shown).

Example 9

PA Reduces Disease Pressure in Sugar Beet Against Cyst Nematodes

To test whether the compounds of the invention are effective against other nematodes and in other plant species, PA was tested on the interaction between the dicot crop sugar beet (*Beta vulgaris*) and the cyst nematode *Heterodera schachtii*. At this point, it was not known whether dicots would tolerate PA as well as monocots and so a much lower dose (10 µM) was used instead.

Figure 10:
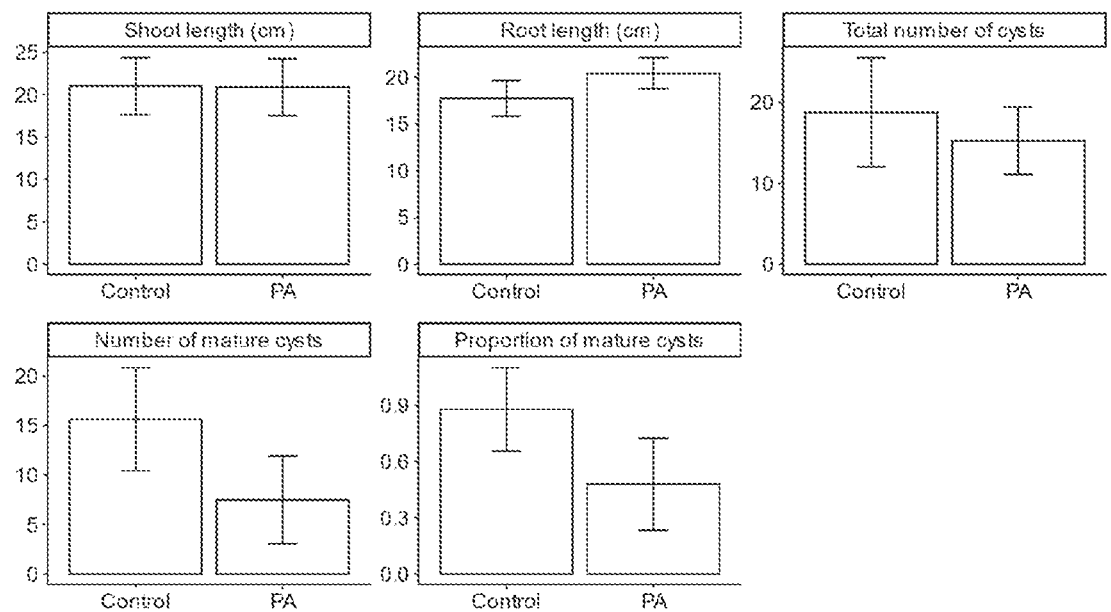
FIG. 10: bar charts of the mean values of five traits in sugar beet infected with *H. schachtii*, with standard deviation shown as error bars after treatment with either 10 μM of piperonylic acid (PA) or a control treatment. 'Mature cysts' refer to desiccated, egg-filled cysts. N=8.

The results of the experiment are summarized in Table 10 and FIG. 10. PA treatment reduced the number of *Heterodera schachtii* nematodes by a statistically insignificant 20%. However, there was a highly statistically significant reduction in the number of mature cysts (−52%), which suggests strong inhibition of nematode development and reproduction. Root length increased significantly upon PA treatment, whereas shoot length was unaffected.

TABLE 10 comparison of five traits between piperonylic acid (PA)-treated and mock-treated (Control) sugar beet plants infected with *H. schachtii*, with mean and standard deviation reported.

| | Shoot length (cm) | Root length (cm) | Total number of cysts | Number of mature cysts | Proportion of mature cysts |
|---|---|---|---|---|---|
| Control (n = 8) | 21.0 ± 3.3 | 17.8 ± 1.9 | 18.8 ± 9.2 | 15.6 ± 5.2 | 0.88 ± 0.22 |
| PA (n = 8) | 20.9 ± 3.4 | 20.4 ± 1.7 | 15.3 ± 0.7 | 7.5 ± 4.4 | 0.48 ± 0.25 |
| | p = 0.394 | p = 0.018 | p = 0.398 | p = 0.008 | p = 0.011 |

Even when applied as a single, very low (10 µM) dose, PA significantly inhibits the development and reproduction of the sugar beet cyst nematode *Heterodera schachtii*. This experiment demonstrates that the compounds of the invention can not only control root-knot nematodes in monocots, but also enhance defense against cyst nematodes in dicots.

Interestingly, a statistically significant increase in root length is observed. Given that sugar beets devote most of their available energy to the development of the primary root, which acts a storage organ, this increase suggests that PA treatment significantly reduces the energy drain caused by nematode infection.

Example 10

C4H Inhibitors Reduce *Pratylenchus penetrans* Disease Pressure in Wheat (*Triticum aestivum* cv. Sahara)

In this experiment, the ability of a foliar spray of piperonylic acid (PA) to control the migratory nematode *Pratylenchus penetrans* in wheat (*Triticum aestivum* cv. Sahara) was demonstrated.

Figure 11:
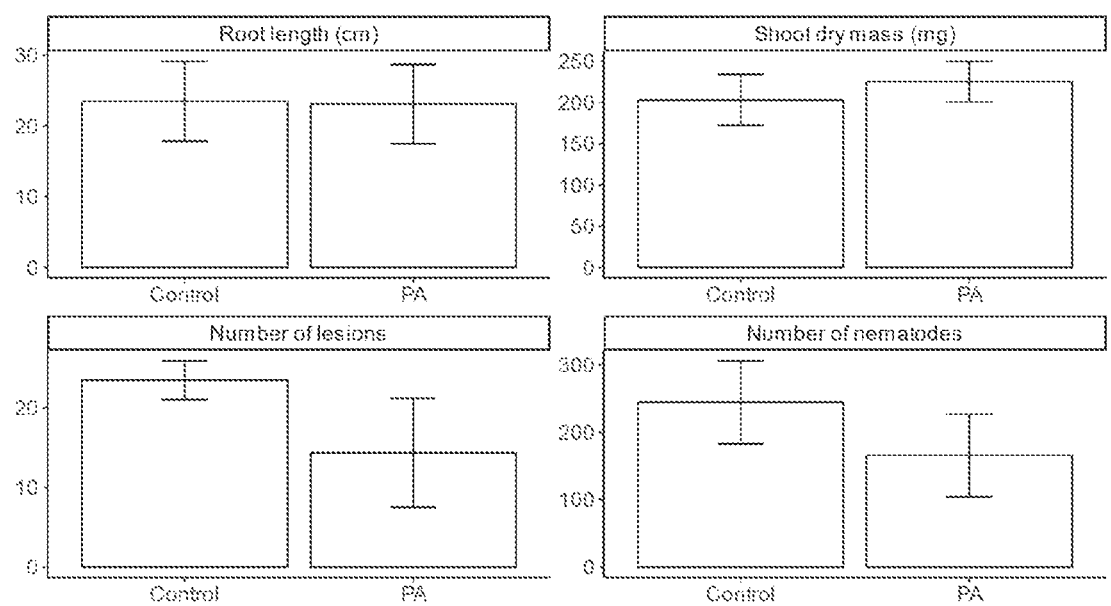
FIG. 11. effect of piperonylic acid (PA) in wheat on root system length, shoot dry mass, the number of lesions per root system and the number of *P. penetrans* nematodes per root system compared to a control group (CON). Bars show mean values; error bars indicate standard deviation. N=8.

The results of the experiment are summarized in Table 11 and FIG. 11. PA treatment reduced the mean number of *P. penetrans* nematodes found in the root system (−32%, p=0.0246) as well as the mean number of root lesions in the host plant (−39%, p=0.0072).

TABLE 11 comparison of five traits between piperonylic acid (PA)-treated and mock-treated (Control) wheat plants infected with *P. penetrans*, with mean and standard deviation reported.

| | Shoot dry mass (mg) | Root length (cm) | Number of lesions | Number of nematodes per root system |
|---|---|---|---|---|
| Control (n = 8) | 203.1 ± 30.8 | 23.5 ± 5.6 | 23.5 ± 2.4 | 244.8 ± 61.6 |
| PA (n = 8) | 225.3 ± 24.6 | 23.1 ± 5.6 | 14.4 ± 6.8 | 165.6 ± 61.1 |
| | p = 0.1350 | p = 0.8810 | p = 0.0072 | p = 0.0246 |

In conclusion, Examples 3 to 10 demonstrate that the compounds of the present invention control the major plant-parasitic nematode groups (root-knot, cyst and migratory) in a broad range of crops, using different application regimens.

Example 11

In Vitro Test of C4H Inhibitor Toxicity to Nematodes

To rule out definitively that the compounds of the invention operate through direct toxicity to nematodes, an in vitro toxicity assay on J2 juveniles of the nematodes *Meloidogyne graminicola* and *Heterodera schachtii* was performed.

Figure 12A:
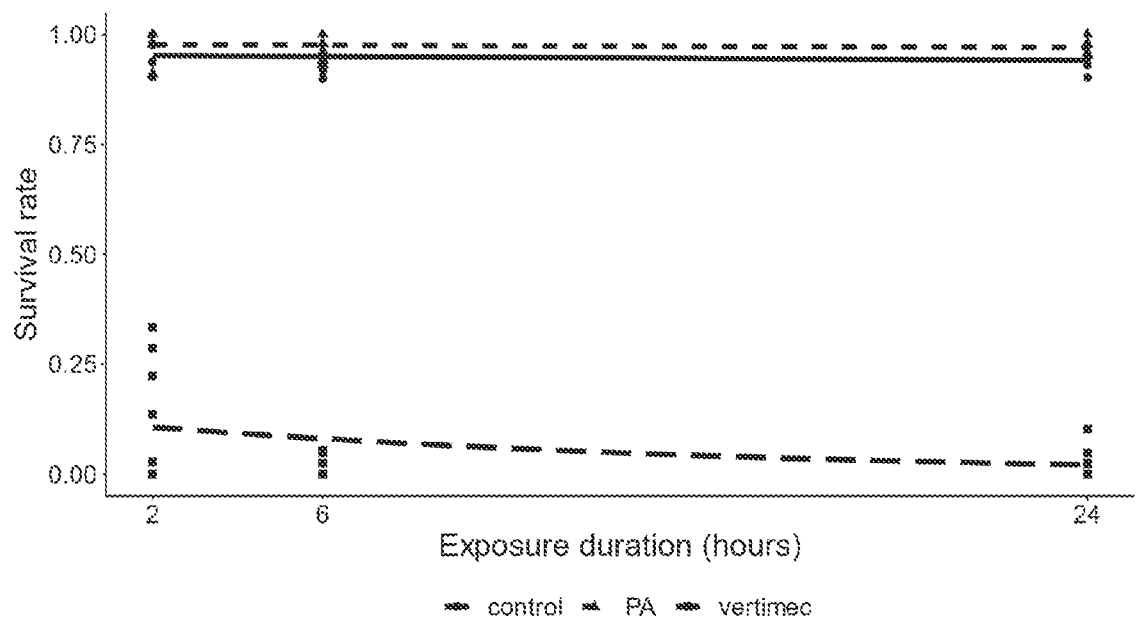
FIG. 12: mixed effect logistic regression of the survival rate of J2 juveniles of *Meloidogyne graminicola* (12a) and *Heterodera schachtii* (12b), with prediction bands shown. 'PA' refers to a 100 μM PA solution, whereas "vertimec" is a 0.02 v/v % abamectin solution. N=300 (6 wells with 50 J2s per treatment each).
Figure 12B:
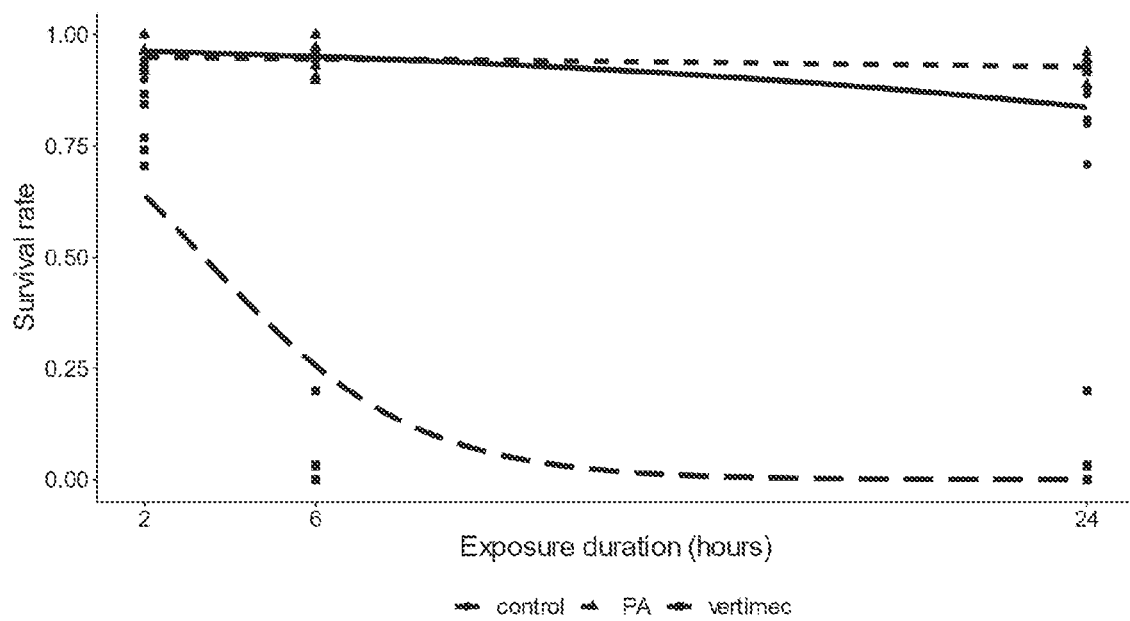

First, survival upon exposure to the C4H inhibitor piperonylic acid (PA) was compared to a negative control (tap water) and a positive control, the commercial nematicide Vertimec (0.02% Abamectin). A detailed survival curve is shown in FIG. 12a (*M. graminicola*) and FIG. 12b (*H. schachtii*). For *Meloidogyne graminicola*, survival differed significantly between control and Vertimec($p<2e-16$) but not between control and PA ($p=0.1340$). For *Heterodera schachtii*, control and Vertimec again differed significantly ($p<0.0001$), whereas control and PA did not ($p=0.3310$).

For *Meloidogyne graminicola*, survival after 24 hours of exposure was (94.2±2.4) % in the control group, (97.1±1.8) % for the PA-treated group and (3.7±3.5) % in the Vertimec-treated group. For *Heterodera schachtii*, survival rates were (83.1±7.6) %, (92.8±2.5) % and (4.4±7.8) % respectively.

These data conclusively show that the compound PA is not nematicidal, which supports the theory that stimulation of the plant immune system rather than toxicity to the nematode underpins the protective effect of C4H inhibitors against nematodes.

Figure 13:
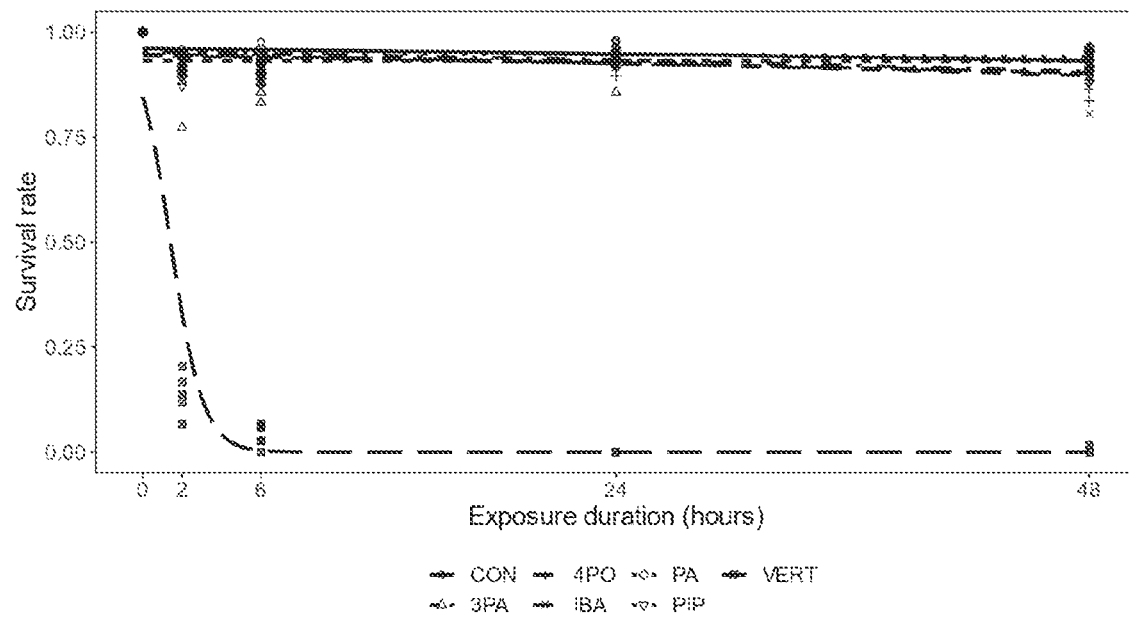
FIG. 13: toxicity of piperonylic acid (PA), piperine (PIP), 4-propynyloxybenzoic acid (4PB), and 3-(4-pyridyl)acrylic acid (3PA) to J2 juveniles of *Meloidogyne graminicola* compared to a control (CON) and the nematicide Vertimec (VERT, 0.02 v/v % abamectin). N=300 (6 wells with 50 nematodes each per compound).

In a second experiment, a broader range of C4H inhibitors were assayed in the same manner. The toxicity of piperonylic acid (PA), piperine (PIP), 4-propynyloxybenzoic acid (4PB), and 3-(4-pyridyl)acrylic acid (3PA) to J2 juveniles of *Meloidogyne graminicola* was compared to a negative control (tap water) and a true nematicide (Vertimec, active ingredient abamectin). The results of this assay are shown in FIG. 13.

Vertimec exposure resulted in 0% survival at the end of the experiment, which differed significantly from 93% survival seen in the water control ($p<0.0001$). By contrast, survival upon exposure to the C4H inhibitors was the same as in the negative control group (PA: 95%, $p=0.9867$; 3PA: 93%, $p=0.9999$; 4PB: 91%, $p=0.7661$; IBA: 89%, $p=0.3519$; PIP: $p=91$%, $p=0.8108$).

Example 12

C4H Inhibitors Reduce *Fusarium* Spp. Disease Pressure in Onion (*Allium cepa*) Seedlings In this experiment, the ability of a seed coating containing piperonylic acid (PA) to control the soilborne fungal pathogens *Fusarium oxysporum* (isolate Foc26), *Fusarium solani* (Fso18) and *Fusarium proliferatum* (Fpr18) in onion seedlings was demonstrated.

Figure 14:
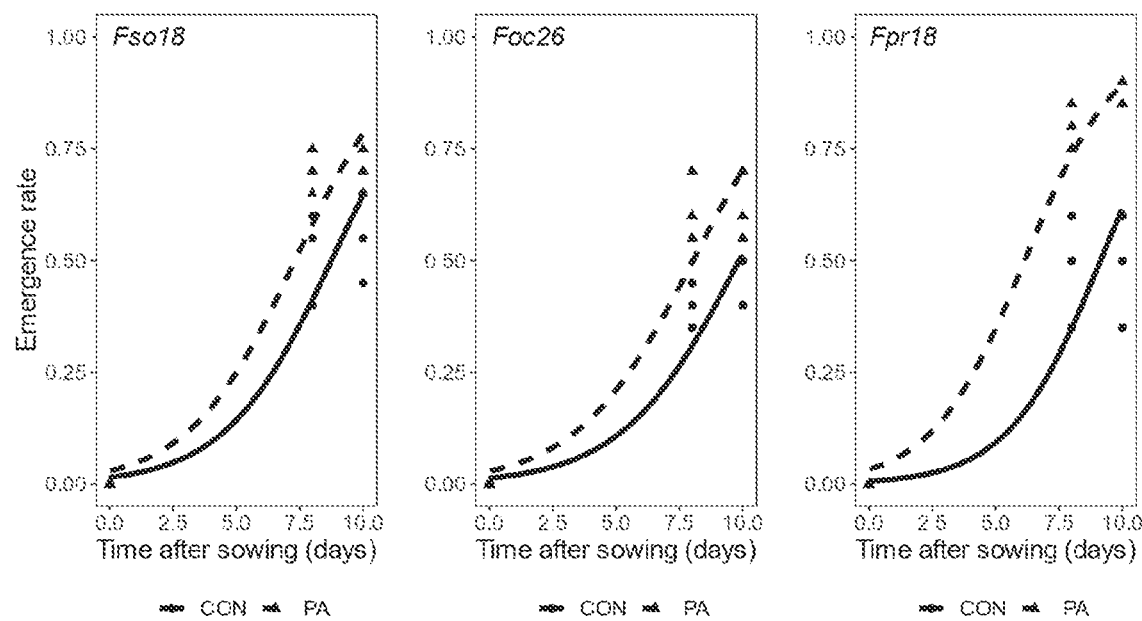
FIG. 14: logistic regression curve of germination over time of onion seeds coated with either a mock coating (CON) or a coating containing piperonylic acid (PA) in soil amended with the soilborne pathogens *Fusarium solani* (isolate Fso18), *Fusarium oxysporum* (isolate Foc26) and *Fusarium proliferatum* (isolate Fpr18). N=60 (3 pots per treatment, 20 seeds per pot).

The results of the experiment are summarized in FIG. 14. A PA coating improved seedling emergence in soil amended with any of the three isolates tested (Fso18: +27%, $p=0.0086$; Foc26: +42%, $p=0.0021$; Fpr18: +79%, $p<0.0001$). This demonstrates that a PA seed coating enhances seedling emergence in soil infested with *Fusarium* spp.

Example 13

C4H Inhibitors Reduce *Botrytis cinerea* Disease Pressure in Tomato (*Solanum lycopersicum* cv. Moneymaker)

In this experiment, the ability of a foliar spray containing piperonylic acid (PA) to control the foliar fungal pathogen *Botrytis cinerea* (isolate R16) in tomato was demonstrated.

Figure 15:
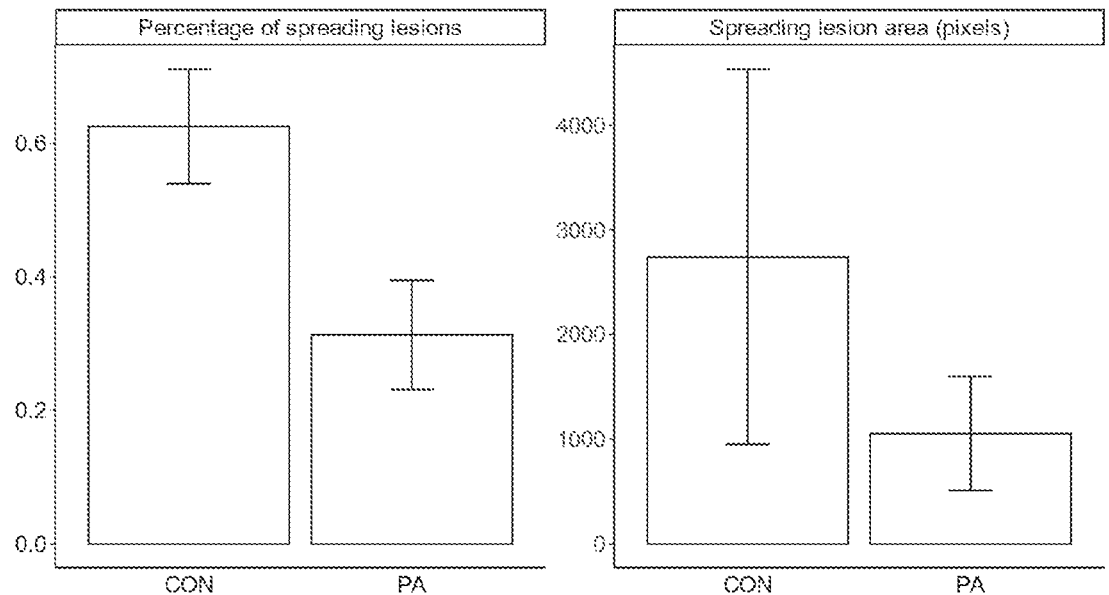
FIG. 15: fraction of inoculation spots that showed successful lesion development (left) and mean area of successfully established lesions (right) in tomato leaves treated with either a control treatment (CON) or spray containing 300 μM of piperonylic acid (PA) four days after inoculation. Bars indicate means, error bars indicate standard deviation. N=36 (6 leaves per treatment, 6 inoculation spots per leaf).

The results of the experiment are summarized in FIG. 15. Treatment with piperonylic acid reduced the number of inoculation spots in which fungal lesions developed (−50%, $p=0.0006$) and reduced the mean size of successfully established/spreading lesions (−62%, $p=0.0073$). These data show that PA treatment inhibits the establishment and expansion of lesions caused by Botrytis infection.

Example 14

In Vitro Assay of C4H Inhibitor Toxicity to Fungi

Figure 16:
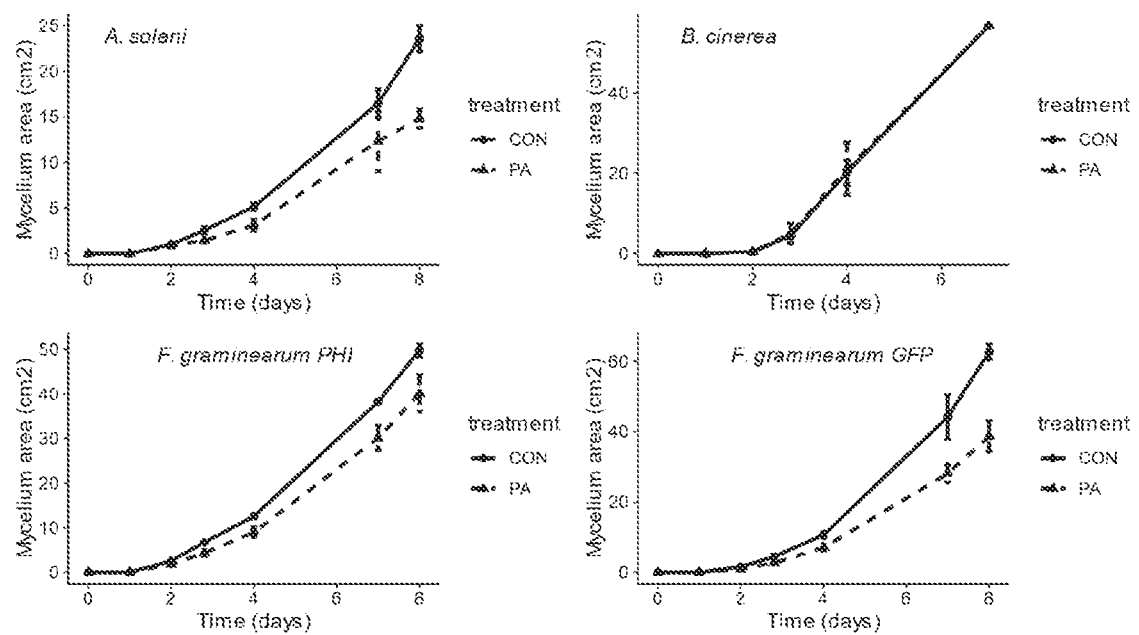
FIG. 16: growth in mycelium area of four fungal isolates belonging to three fungal species (*Alternaria solani*, *Botrytis cinerea* and *Fusarium graminearum* isolates PH1 and GFP). Error bars indicate standard deviation. N=6.
Figure 17:
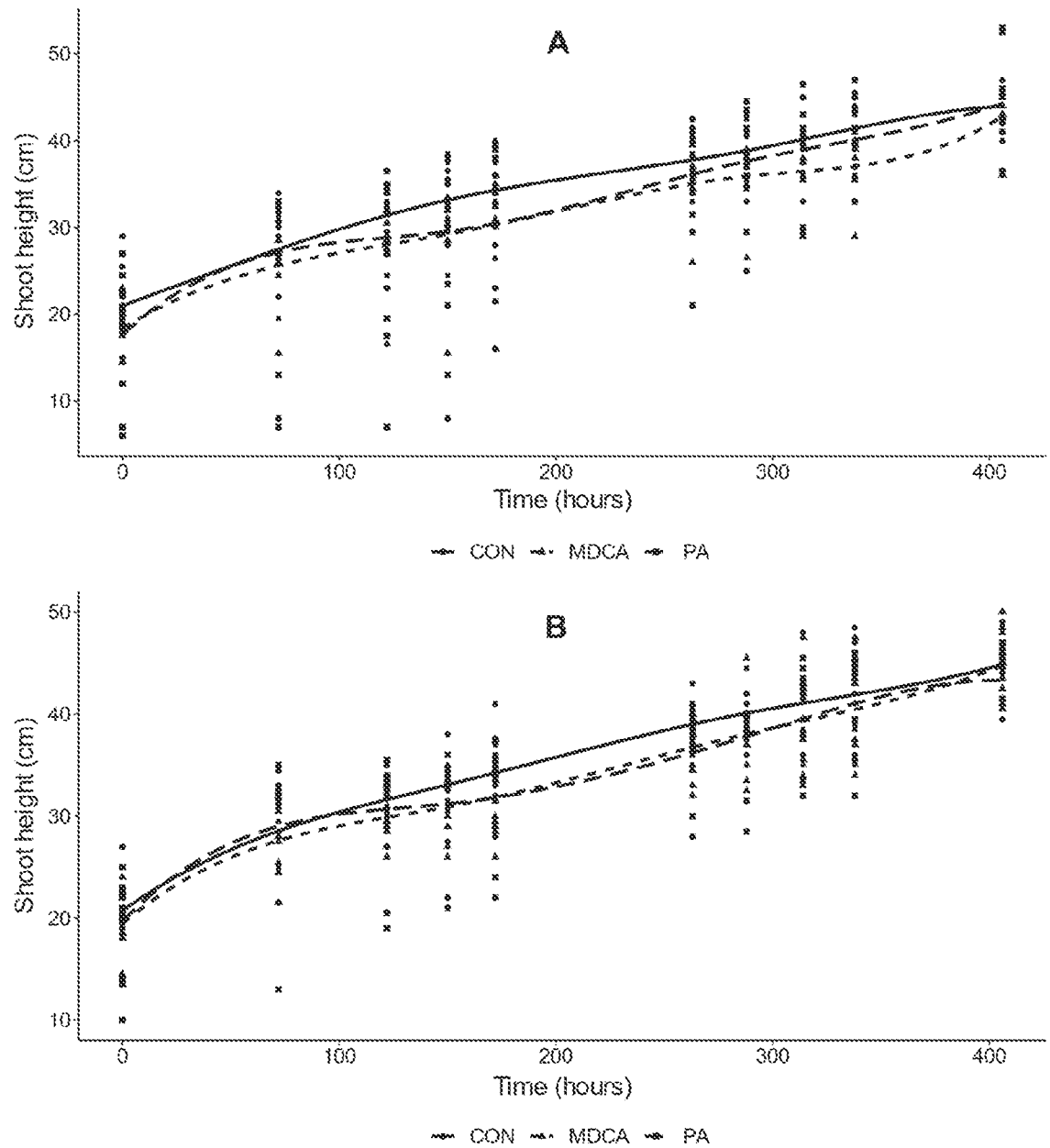
FIG. 17: growth curves for wild type rice plants (A) and OsWRKY45 knockdown plants (B) by treatment. Hour zero corresponds to the start of measurements 8 days after transfer to the growth substrate.

To support the hypothesis that the disease-controlling effect of C4H inhibitors is due to the effect of these molecules on the plant immune system rather than direct fungicidal effects, the toxicity of piperonylic acid (PA) was investigated in four fungal isolates: *Alternaria solani*, *Botrytis cinerea* R16, *Fusarium* graminearum PH1 and *Fusarium graminearum* GFP. The results of the experiment are summarized in FIG. 16.

Fungal spores inoculated on agar containing PA at a concentration of 300 μM for eight days germinated normally, but showed a slight (species-specific) growth retardation compared to those grown on control agar. Although the effect is statistically significant in some isolates (*A. solani*: $p<0.0001$; *B. cinerea*: $p=0.7740$; *F. graminearum* PH1: $p<0.0001$; *F. graminearum* GFP: $p<0.0001$), these data show that PA is not sufficiently fungicidal to have a significant effect when used as a foliar spray. After all, given the rapid sequestration of PA in planta (Steenackers et al., 2016), a fungus in a PA-treated plant would not be exposed to PA for any length of time.

Example 15

Testing Analogs of 4-iodobenzoic Acid for C4H Inhibitor Activity

Further structural analogs of the C4H inhibitor 4-iodobenzoic acid (IBA) were tested for their ability to inhibit the C4H enzyme in a yeast heterologous expression assay. In addition to 4-propynyloxybenzoic acid, an additional structural analog of 4-iodobenzoic acid (without a halogen atom as the 4-substituent) showed significant C4H inhibitor activity: 4-trifluoromethylbenzoic acid ($CF_3$-BA).

When tested in an in vitro assay on *Arabidopsis thaliana* (ecotype Col-0) growth, seedlings grown on medium amended with $CF_3$-BA showed an identical phenotype to those grown on medium containing IBA: significantly shorter adventitious root, induction of lateral and adventitious rooting, marked agravitropy (bending of the primary root away from the vertical axis) and reduced rosette growth. The results of the experiment are summarized in Table 12.

These data show that $CF_3$-BA phenocopies the effects of IBA; combined with its structural similarity to IBA and its similar effects in a heterologous expression assay, it can be concluded that $CF_3$-BA is a C4H inhibitor.

TABLE 12 mean rosette area, primary root length, agravitropy ratio (the ratio of the distance between primary root tip and base divided by total primary root length; a proxy for disturbance of gravitropy) and germination rate in 14 days old *A. thaliana* ecotype Col-0 seedlings exposed to 4-iodobenzoic acid (IBA) or 4-trifluoromethylbenzoic acid ($CF_3$-BA) at concentrations of 50 or 100 µM, with standard deviation shown.

|  | Control n = 27 | IBA 50 µM n = 24 | IBA 100 µM n = 38 | $CF_3$-BA 50 µM n = 39 | $CF_3$-BA 100 µM n = 22 |
|---|---|---|---|---|---|
| Rosette area ($cm^2$) | 2.25 ± 0.42 | 0.10 ± 0.06 p < 0.0001 | 0.05 ± 0.01 p < 0.0001 | 0.16 ± 0.06 p < 0.0001 | 0.15 ± 0.09 p < 0.0001 |
| Primary root length (cm) | 4.63 ± 0.73 | 0.43 ± 0.15 p < 0.0001 | 0.28 ± 0.07 p < 0.0001 | 0.42 ± 0.14 p < 0.0001 | 0.41 ± 0.14 p < 0.0001 |
| Agravitropy ratio | 0.96 ± 0.03 | 0.78 ± 0.17 p = 0.0003 | 0.82 ± 0.11 p < 0.0001 | 0.79 ± 0.15 p < 0.0001 | 0.81 ± 0.10 p < 0.0001 |
| Germination rate | 0.89 ± 0.32 | 0.88 ± 0.34 p = 1.0000 | 0.84 ± 0.37 p = 1.0000 | 0.95 ± 0.22 p = 1.0000 | 0.84 ± 0.37 p = 1.0000 |

Example 16

Effect of MDCA/PA on *Meloidogyne graminicola* Infection in an OsWRKY45 Rice Knockdown Line To test the potential involvement of salicylic acid (SA) in MDCA/PA defense enhancement the response of MDCA/PA-treated RNAi-knockdown mutants in OsWRKY45 to nematode infection was examined. The OsWRKY proteins form a family of rice transcription factors that regulate a broad range of cellular processes, most of which are related to abiotic and biotic stress response (Jimmy and Babu, 2015). In keeping with their important role in defense, many OsWRKY genes are controlled by the plant defense hormones jasmonic acid and SA (Ryu et al., 2006; Jimmy and Babu, 2015).

OsWRKY45 is a master regulator of SA-induced defense responses. Knockdown lines in this gene are useful for testing whether MDCA/PA defense enhancement depends on SA signaling, as OsWRKY45 (unlike most other defense genes) is believed to be triggered only by SA (Ryu et al. 2006; incorporated by reference).

If the OsWRKY45 knockdown line does not show enhanced defense after MDCA/PA-treatment, this would provide strong evidence for SA being the causative agent of MDCA/PA-mediated defense enhancement. The reverse would provide strong evidence that SA is not the main causal agent of MDCA/PA-related defense enhancement.

Figure 18:
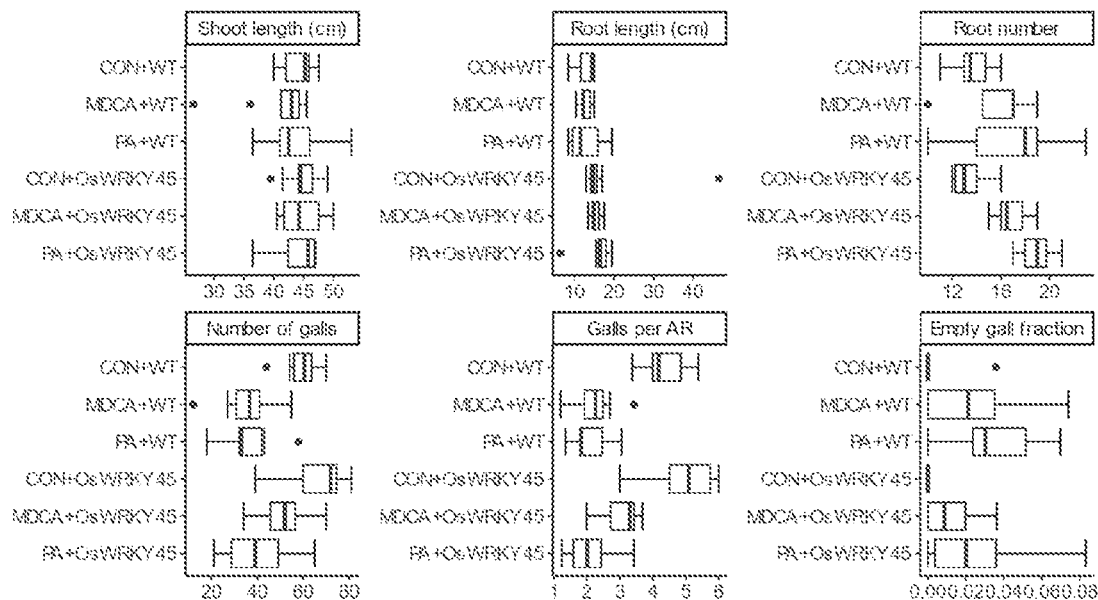
FIG. 18: box plots of phenotypic traits, with dots indicating outliers. Sample size=63 (10 wild type+control, 10 OsWRKY45 knock-down+control, 8 wild type+MDCA, 10 OsWRKY45 knock-down+MDCA, 9 wild type+PA, 10 OsWRKY45 knock-down+PA). Non-empty galls were classified as small, medium, large or very large; fraction of small galls is the proportion of small galls.

Phenotypic parameters of the root system are shown in Table 13 and FIG. 18. Galls were counted and classified by their size and by whether they were empty or not. The presence or absence of necrosis in the root system was also recorded.

As in the previous experiment, MDCA/PA treatment greatly reduces gall count both in absolute terms and on a per-root basis. Notably, MDCA/PA-treatment increased root number in both the wild type and the OsWRKY45 knockdown line compared to the untreated WT and untreated OsWRKY45 RNAi plants. Once again, MDCA/PA-treated plants showed empty galls, something not seen in infected, untreated control plants.

The OsWRKY45 knockdown line hosted more galls than the wild type regardless of treatment. However, the proportional reduction in gall count is similar in wild type and OsWRKY45, suggesting that MDCA/PA work equally well in both genetic backgrounds. This contradicts the hypothesis that SA signaling is the principal factor in MDCA/PA-mediated defense enhancement.

Knockdown of the WRKY45 transcription factor (and hence inhibition of salicylic acid response) increases the number of *Meloidogyne graminicola* galls slightly, albeit not significantly (+12%, p=0.5415), compared to the control. However, the C4H inhibitors piperonylic acid (PA) and 3,4-methylenedioxycinnamic acid (MDCA) both significantly reduce the number of galls per root system in both wild type and WRKY45-RNAi plants (WT+PA vs WT+CON: −42%, p<0.0001; WT+MDCA vs WT+CON: −42%, p<0.0001; WRKY45+PA vs WRKY45+CON: −41%, p=0.0006; WRKY45+MDCA vs WRKY45+MDCA: −23%, p=0.0420). This strongly suggests that salicylic acid accumulation does not explain C4H inhibitor-induced resistance.

TABLE 13 median values and interquartile ranges (in brackets) for various phenotypic traits in both wild type and WRKY45-RNAi knockdown plants infected with *Meloidogyne graminicola* and treated with either a control solution or with an MDCA/PA spray. Significant differences (p ≤ 0.05) are indicated using a Tukey letter display.

|  | Wild type | | | WRKY45 | | |
|---|---|---|---|---|---|---|
|  | Control (n = 10) | MDCA (n = 8) | PA (n = 9) | Control (n = 10) | MDCA (n = 10) | PA (n = 10) |
| Shoot length (cm) | 45.3 (3.9) a | 43.0 (3.0) a | 42.5 (7.8) a | 44.5 (2.4) a | 44.3 (5.8) a | 45.8 (4.5) a |
| Root length (cm) | 14.8 (1.6) a | 12.3 (2.0) a | 12.5 (6.5) a | 14.5 (3.4) a | 15.0 (1.8) a | 16.5 (1.9) a |
| Root number | 13.5 (1.8) bc | 17.0 (2.5) c | 18.0 (5.0) c | 13.0 (1.0) bc | 16.5 (1.8) ab | 18.0 (1.8) ab |
| Gall number | 60.5 (7.8) a | 36.5 (10.3) c | 33.0 (10.0) bc | 72.0 (14.5) a | 52.0 (10.8) ab | 39.0 (20.3) bc |

TABLE 13-continued median values and interquartile ranges (in brackets) for various phenotypic traits
in both wild type and WRKY45-RNAi knockdown plants infected with *Meloidogyne graminicola*
and treated with either a control solution or with an MDCA/PA spray. Significant
differences (p ≤ 0.05) are indicated using a Tukey letter display.

|  | Wild type | | | WRKY45 | | |
|---|---|---|---|---|---|---|
|  | Control (n = 10) | MDCA (n = 8) | PA (n = 9) | Control (n = 10) | MDCA (n = 10) | PA (n = 10) |
| Galls per AR | 4.2 (0.9) a | 2.3 (0.6) b | 1.8 (0.5) b | 5.1 (1.4) a | 3.3 (0.7) b | 2.2 (0.8) b |
| Fraction of empty galls | 0.0 (0.0) b | 0.02 (0.04) ab | 0.03 (0.03) a | 0.0 (0.0) b | 0.09 (0.01) a | 0.02 (0.03) ab |
| Fraction of small galls | 0.93 (0.02) a | 0.86 (0.07) a | 0.93 (0.06) a | 0.91 (0.04) a | 0.94 (0.03) a | 0.91 (0.05) a |
| Likelihood of necrosis | 0.30 ± 0.48 a | 0.63 ± 0.52 b | 0.78 ± 0.44 b | 0.60 ± 0.52 b | 0.50 ± 0.53 b | 0.60 ± 0.52 b |

Example 17

The Activity of C4H Inhibitors Against Root-Knot Nematodes is Independent of Salicylic Acid in Tomato (*Solanum lycopersicum* cv. Moneymaker)

It has previously been reported that the C4H inhibitor piperonylic acid (PA) induces the accumulation of the defense hormone salicylic acid in tobacco cell cultures (*Nicotinium tabacum* BY2) (Schoch et al., 2002).

To evaluate this further, a tomato line deficient in salicylic acid biosynthesis and signaling respectively was treated with PA. The tomato line expressed the NahG transgenic construct, which converts salicylic acid into inactive catechol (Brading et al., 2000). If this line still responds to PA, it further strengthens the notion that salicylic acid accumulation is not the cause of C4H inhibitor-induced nematode resistance, for which evidence in rice was already provided in Example 16.

Figure 19:
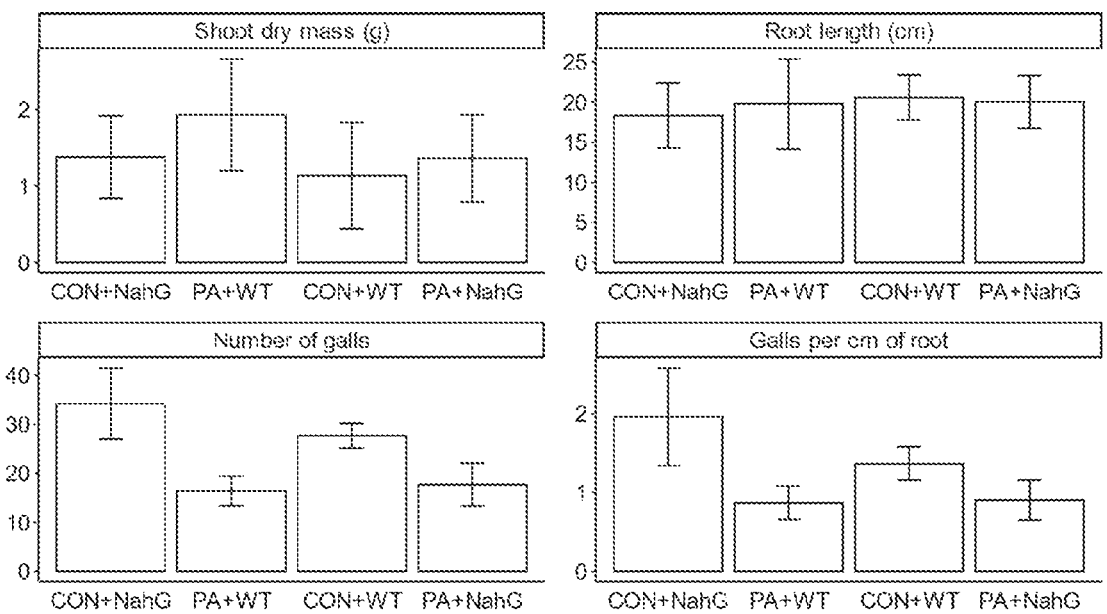
FIG. 19: effect of piperonylic acid (PA) on shoot dry mass, root length, number of galls per root system and number of galls per cm of primary root compared to a control group (CON) in both wild type tomato plants (WT) and NahG-expressing transgenic tomato plants (NahG, SA-deficient line). Bars show mean values; error bars indicate standard deviation. N=8.

The results of this experiment are shown in FIG. 19. NahG-expressing tomato plants are significantly more susceptible to *Meloidogyne incognita* than the wild type as measured by the number of galls (+23%, p=0.0357). However, they still respond to PA treatment: PA-treated NahG plants show significantly fewer galls than untreated wild type plants (−36%, p=0.0012) and do not differ significantly from PA-treated wild type plants in number of galls (+9%, p=0.9499). These data demonstrate that the defense-inducing activity of PA is not dependent on salicylic acid accumulation.

In example 16, we have shown that the C4H inhibitors piperonylic acid (PA) and 3,4-methylenedioxycinnamic acid (MDCA) both significantly reduce the number of galls per root system in both wild type and WRKY45-RNAi plants (WT+PA vs WT+CON: −42%, p<0.0001; WT+MDCA vs WT+CON: −42%, p<0.0001; WRKY45+PA vs WRKY45+CON: −41%, p=0.0006; WRKY45+MDCA vs WRKY45+MDCA: −23%, p=0.0420). The data of examples 16 and 17 clearly demonstrate that that salicylic acid accumulation does not explain C4H inhibitor-induced resistance.

Example 18

The Activity of C4H Inhibitors Against Root-Knot Nematodes is Independent of Jasmonic Acid in Tomato (*Solanum lycopersicum* cv. Moneymaker)

Although there is no obvious link between C4H inhibition and the accumulation of the defense hormone jasmonic acid, it had previously been observed that other defense inducers did cause such an accumulation and that jasmonate itself can induce a measure of resistance against root-knot nematodes when applied to plants (Cooper, Jia and Goggin, 2005; Nahar et al., 2011; Martinez-Medina et al., 2017).

To determine whether C4H inhibitors depend on this hormonal pathway, it was tested whether tomato plants treated with the chemical inhibitor of jasmonic acid biosynthesis diethyldithiocarbamate (DIECA) (Farmer et al., 1994) still responded to PA treatment.

Figure 20:
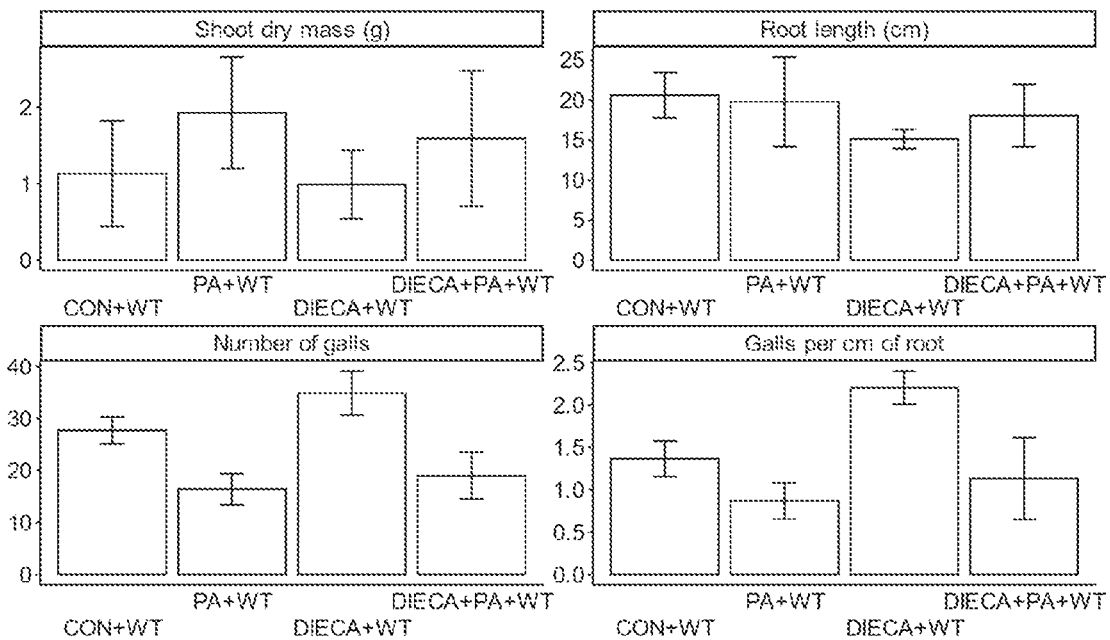
FIG. 20: effect of piperonylic acid (PA) on shoot dry mass, root length, number of galls per root system and number of galls per cm of primary root compared to a control group (CON) in both wild type tomato plants (WT) with and without treatment with JA-biosynthesis inhibitor *diethyldithiocarbamic acid* (DIECA). Bars show mean values; error bars indicate standard deviation. N=8.

The results of this experiment are shown in FIG. 20. DIECA-treated tomato plants are significantly more susceptible to *Meloidogyne incognita* than the wild type as measured by the number of galls (+26%, p=0.0357). However, they still respond strongly to PA treatment: tomato plants treated with both PA and DIECA show significantly fewer galls than untreated wild type plants (−31%, p=0.0014) and do not differ significantly from PA-treated wild type plants (+14%, p=0.5760). These data indicate that the defense-inducing activity of PA is not dependent on jasmonic acid accumulation.

Example 19 qPCR Analysis of SA-Related Genes After MDCA/PA Treatment

MDCA/PA-treatment enhance rice defense against nematodes and induces various symptoms reminiscent of enhanced SA signaling (hypersensitive response, mild growth retardation and reduced disease pressure). However, example 16 and 17 proved that SA accumulation cannot be the only or even principal cause of C4H-inhibitor induced defense enhancement. To further explore this, a qRT-PCR experiment was performed to test the effect of MDCA/PA on the expression of six genes involved in the SA homeostasis: four genes involved in phenylpropanoid SA biosynthesis (OsPAL2/4/6 and OsC4H), one gene involved in isochorismate-based biosynthesis of SA (OsICS1) and one SA-responsive gene (OsWRKY45).

The three OsPAL genes were chosen ad hoc as these three are the only ones for which selective qPCR primers are available (Tonnessen et al., 2014). The expression of these genes was assessed in root samples.

Significant upregulation of OsPAL4 was observed in C4H-inhibitor treated plants; this correlates with literature observations that induction of OsPAL4 is associated with defense in rice (Tonnessen et al., 2014). An even stronger upregulation was observed for the OsC4H gene. This points towards strong compensatory upregulation of the C4H gene in response to C4H inhibition, which might lie at the root of C4H inhibitor-mediated defense enhancement and explains why C4H inhibitors cause no significant phenotypic effects in healthy plants. Together with the observed upregulation of OsPAL4, these qPCR results suggest that C4H inhibitors trigger the phenylpropanoid pathway, an important player in plant basal immunity.

For the other genes, including the SA-sensitive OsWRKY45 transcription factor, no significant upregulation was observed. This provides further evidence that SA-accumulation is not the principal cause of PA/MDCA-induced immune responses in rice roots.

Figure 21:
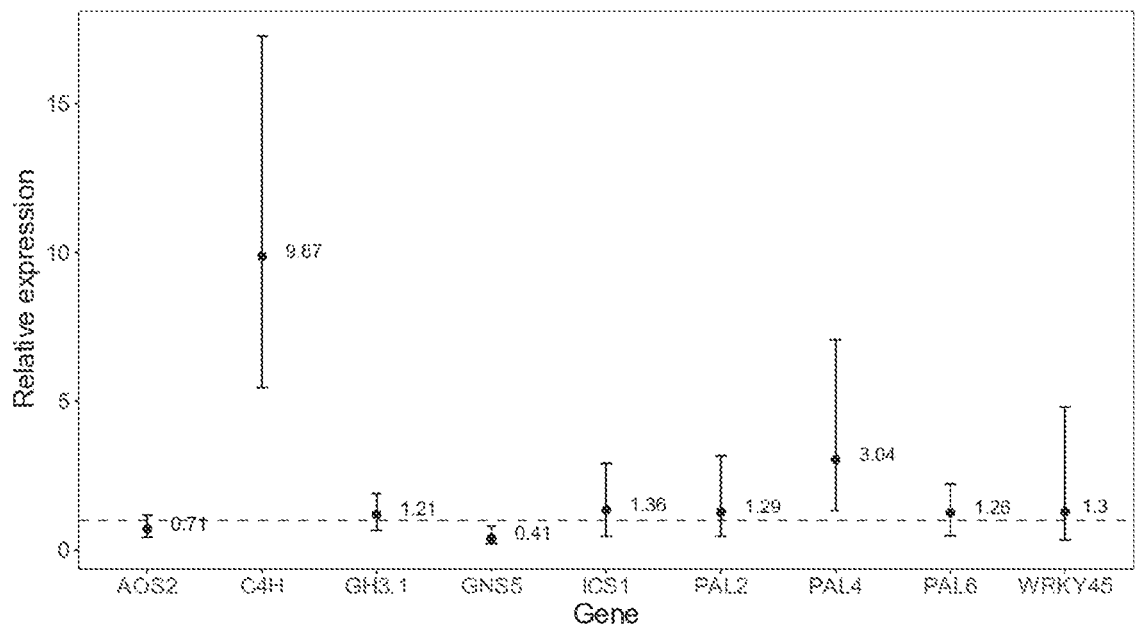
FIG. 21: qRT-PCR-based expression of several genes after PA treatment on rice plants relative to control plants. The horizontal dashed line indicates the baseline level of untreated control plants, set to 1.0. Dots indicate mean relative expression, error bars show the 95% confidence interval. N=3 (three pools of three plants each per treatment).

A summary of the results can be found in Table 14 and in FIG. 21.

TABLE 14 changes in the expression of six rice genes involved in SA biosynthesis and signaling and in basal defense after treatment with piperonylic acid (PA) or 3,4-methylenedioxycinnamic acid (MDCA). Log-fold change values were obtained through Pffafl's method; p-values were calculated using permutation tests.

| Gene | Treatment | Fold change vs. control | 95% confidence interval | p-value vs. control |
| --- | --- | --- | --- | --- |
| OsPAL2 | MDCA | 1.86 | 1.22-3.44 | 0.068 |
|  | PA | 1.29 | 0.47-3.17 | 0.501 |
| OsPAL4 | MDCA | 2.38 | 1.44-3.94 | 0.005 |
|  | PA | 3.04 | 1.33-7.06 | 0.045 |
| OsPAL6 | MDCA | 1.40 | 0.54-2.75 | 0.375 |
|  | PA | 1.26 | 0.48-2.22 | 0.775 |
| OsC4H | MDCA | 3.73 | 5.68-8.93 | 0.030 |
|  | PA | 9.87 | 5.45-17.27 | 0.025 |
| OsICS1 | MDCA | 1.73 | 0.78-4.23 | 0.175 |
|  | PA | 1.36 | 0.47-2.91 | 0.680 |
| OsWRKY45 | MDCA | 1.67 | 0.60-4.42 | 0.378 |
|  | PA | 1.30 | 0.35-4.80 | 0.693 |

Example 20 qPCR Analysis of Additional Defense Genes After C4H Inhibitor Treatment

As the previous example demonstrates, gene expression analysis found no evidence for significant salicylic acid accumulation in C4H-inhibitor treated whole plants. To test whether other defense hormones might be involved, genes responsive to jasmonic acid (the biosynthesis gene OsAOS2) and auxin (the auxin conjugating enzyme OsGH3.1) were investigated. Moreover, the callose-degrading enzyme OsGNS5, downregulation of which is associated with basal defense, was also investigated. The qRT-PCR analysis was performed on the same samples used in the previous Example.

Neither the auxin nor the jasmonic acid response genes showed significant differential expression. By contrast, the OsGNS5 gene was significantly downregulated—a result that was previously correlated with increased callose deposition and hence enhanced basal immunity (Ji et al., 2015). Results are summarized in FIG. 21 and Table 15.

TABLE 15 changes in the expression of three further rice genes after treatment with piperonylic acid (PA): the jasmonic acid biosynthesis gene OsAOS2, the auxin-responsive gene OsGH3.1 and the callose degradation gene OsGNS5. Log-fold change values were obtained through Pffafl's method; p-values were calculated using permutation tests.

| Gene | Treatment | Fold change vs. control | 95% confidence interval | p-value vs. control |
| --- | --- | --- | --- | --- |
| OsAOS2 | PA | 0.71 | 0.44-1.17 | 0.251 |
| OsGH3.1 | PA | 1.21 | 0.67-1.90 | 0.363 |
| OsGNS5 | PA | 0.41 | 0.24-0.81 | 0.032 |

Example 21

C4H Inhibitors Reduce *Pseudomonas syringae* DC3000 Disease Pressure in Tomato (*Solanum lycopersicum* cv. Moneymaker)

In this experiment, the ability of a foliar spray containing piperonylic acid (PA) to control the foliar bacterial pathogen *Pseudomonas syringae* (pv. DC3000) in tomato was demonstrated.

Due to the inherent variability of bacterial inoculation experiments (caused by the dependence of the bacteria on open stomata or wounds to enter), three repeats of this experiment are shown here. The first resulted in a relatively modest infection pressure, whereas the second resulted in an extremely high level of disease pressure that caused many tomato leaves to die after as little as three days.

Due to the difference in disease progression, two different scoring systems were used. In the first experiment, the number of lesions per plant was counted three days after inoculation and the percentage of leaf area covered by lesions was quantified using the ImageJ software after seven days. In the second experiment, each fully developed leaf was scored on a disease scale between 0 and 4 as follows: 0=no visible symptoms; 1=isolated lesions; 2=large lesions, covering <50% of leaf area; 3=lesions covering more than half of the leaf area; 4=leaf irreversibly shriveled or abscised. Each plant was then awarded a total disease index score, which is the median of the individual disease scores for each leaf.

Figure 22A:
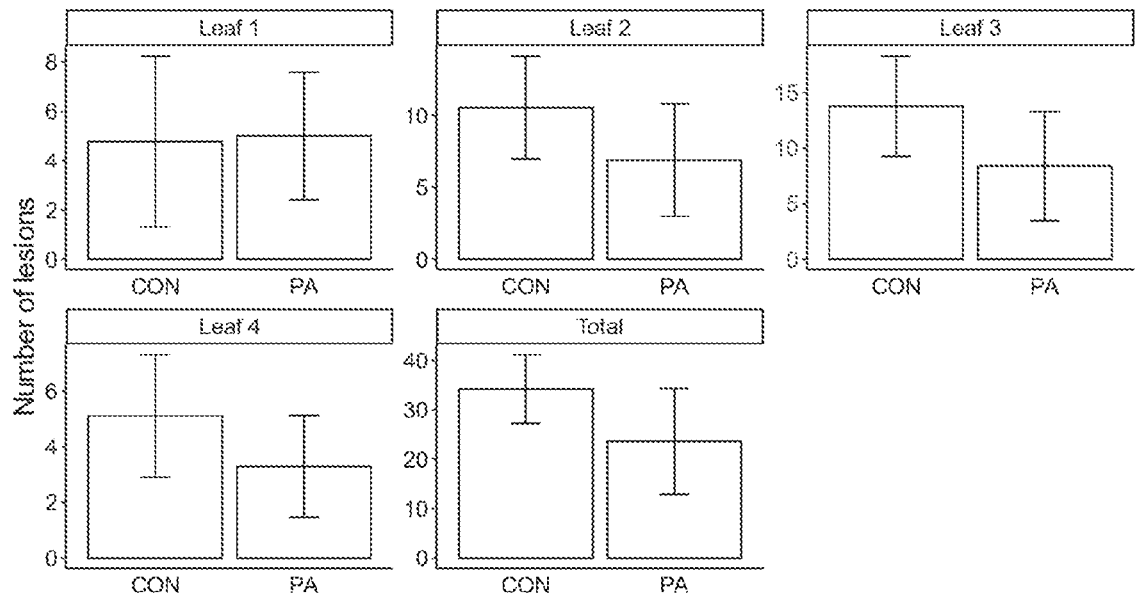
FIG. 22: effect of piperonylic acid (PA) in tomato on the number of *Pseudomonas syringae* lesions three days after inoculation (22a) and the percentage of leaf area covered by those lesions after seven days (22b) compared to a control group (CON). Bars show mean values; error bars indicate standard deviation. 'Leaf 1' refers to the first real leaf; cotyledons were not taken into account. N=8.
Figure 22B:
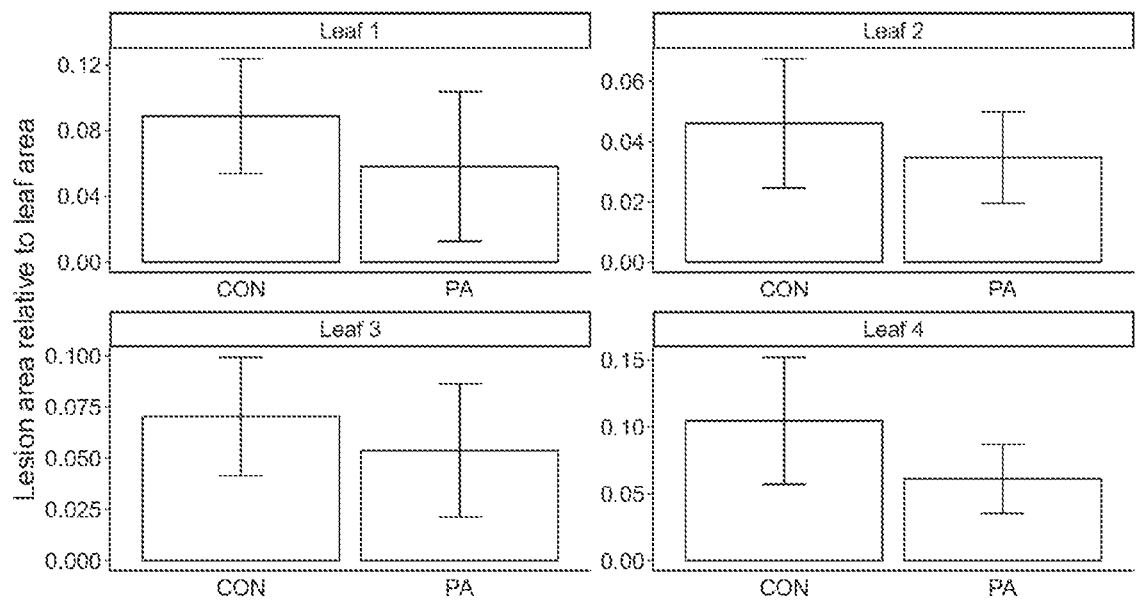
Figure 23:
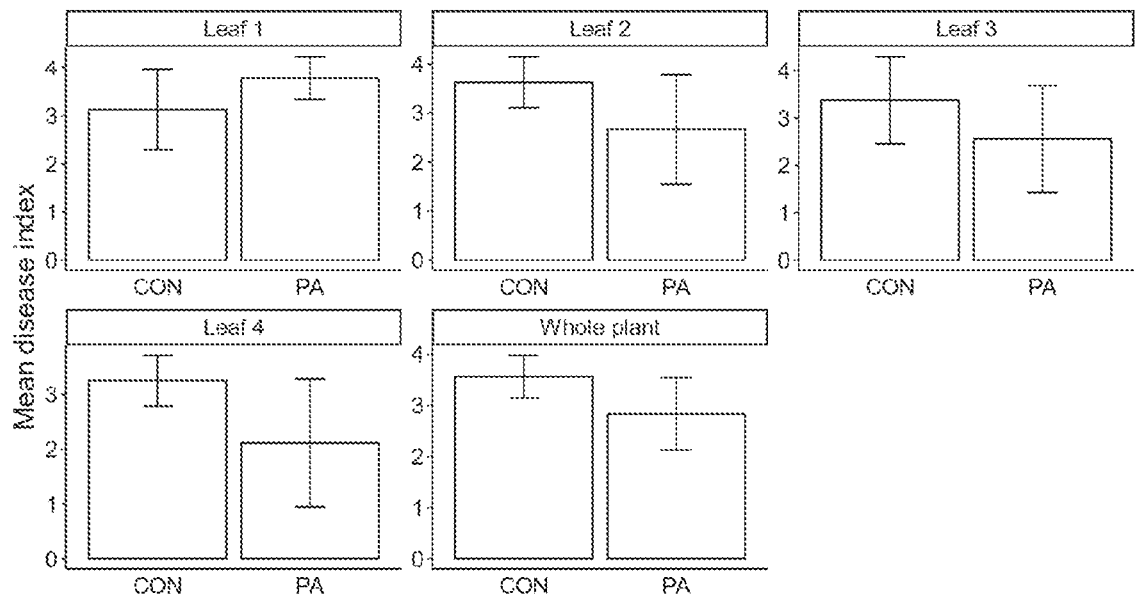
FIG. 23: effect of piperonylic acid (PA) in tomato on the mean disease index three days after inoculation with *Pseudomonas syringae* compared to a control group (CON); the whole plant disease index is the median of the four per-leaf scores. Bars show mean values; error bars indicate standard deviation. N=9.
Figure 24:
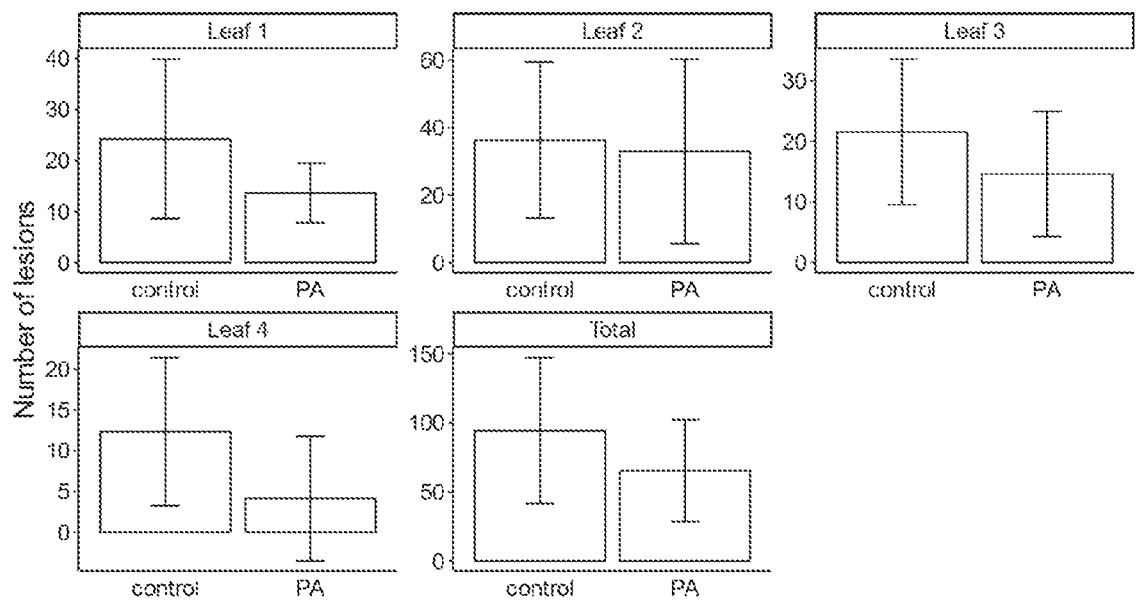
FIG. 24: effect of piperonylic acid (PA) in tomato on the number of *Pseudomonas syringae* lesions five days after inoculation compared to a control group (CON). Bars show mean values; error bars indicate standard deviation. 'Leaf 1' refers to the first real leaf; cotyledons were not taken into account. N=10.
Figure 25A:
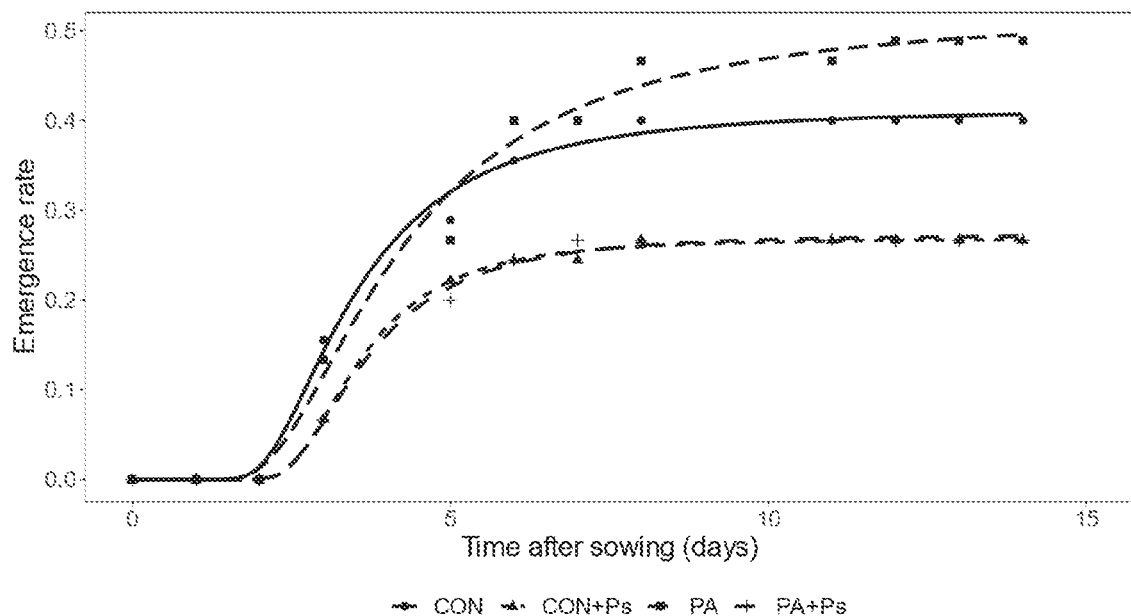
FIG. 25: (a) effect of a 500 μM piperonylic acid coating compared to a mock coating on germination in soil with or without *Pythium splendens* (PA: piperonylic acid coating, no *Pythium*; CON: mock coating, no *Pythium*; PA+Ps: piperonylic acid coating, *Pythium splendens*; CON+Ps: mock coating, *Pythium splendens*); N=45. (b) plant health score of emerged seedlings fourteen days after the start of the experiment. Scores: 0=seedling died after emergence; 1=seedling alive but stunted; 2=seedling healthy. (c) primary root length fourteen days after the start of the experiment, with bars indicating means and error bars standard deviation.
Figure 25B:
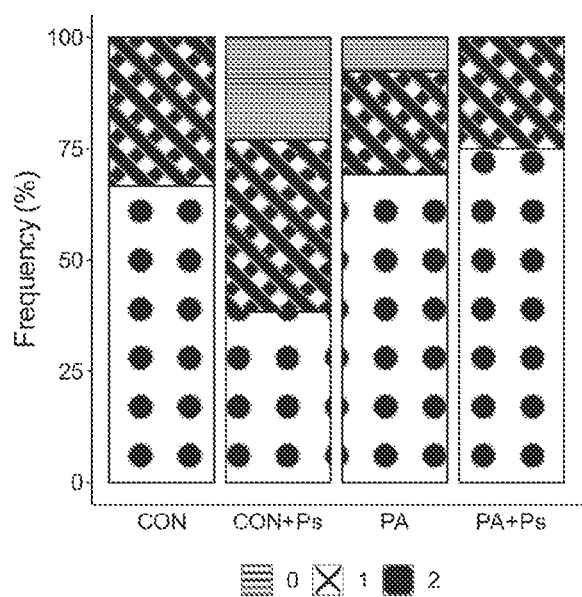
Figure 25C:
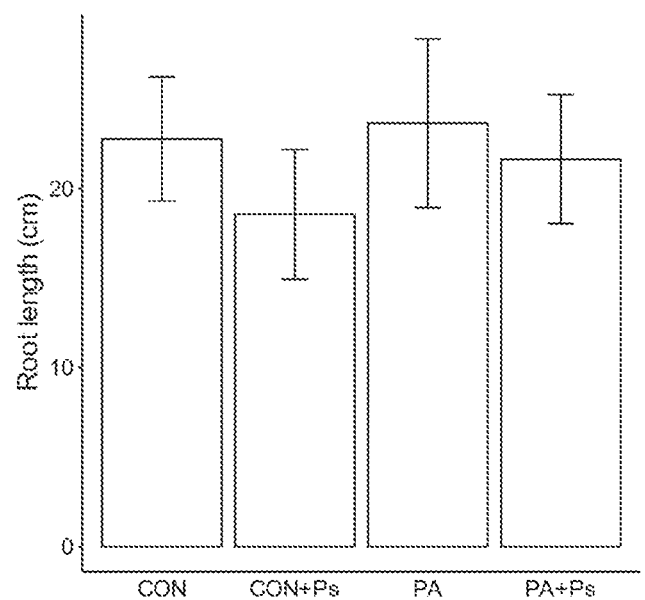

The results of the first experiment are shown in FIG. 22a and FIG. 22b. PA treatment both reduced the total number of lesions per plant (−25%, p=0.0011) and the mean percentage of leaf area covered by lesions. In the second experiment, which is summarized in FIG. 23, PA treatment reduced the mean plant disease index by 20% (p=0.0317).

Prior to inoculation, the effect of piperonylic acid on *Pseudomonas syringae* DC3000 itself was also verified by growing the bacteria on liquid culture amended with piperonylic acid or a corresponding control and measuring the OD600 (as described in the materials and methods section). At a concentration of 100 µM, piperonylic acid had no effect on bacterial growth after twenty-four hours of continuous exposure (OD600 0.737 vs. 0.757, p=0.4857).

In all experiments, piperonylic acid (PA) treatment reduced disease pressure in a statistically significant manner, although the effect size was smaller than what was seen with nematodes or fungi. The effect of PA on *P. syringae* infection cannot be explained by direct toxicity of PA to the bacterium, as even prolonged exposure to PA did not result in growth retardation. Taken together, these experiments demonstrate that C4H inhibitors provide a protective effect against bacterial diseases in crops.

Example 22

C4H Inhibitors Reduce *Pythium splendens* Disease Pressure in Green Bean (*Phaseolus vulgaris* cv. Prelude)

In this experiment, the ability of a seed coating containing piperonylic acid (PA) to control the oomycete pathogen *Pythium splendens* in bean was demonstrated.

A PA seed coating did not improve emergence in soil containing *P. splendens* (see FIG. 25*a*), but seedling health after emergence was significantly improved (see FIG. 25*b*). Shoots were more vigorous, and the primary root of PA-coated seeds in *P. splendens*-infested soil was longer compared to control-coated seeds in *P. splendens* infested soil (p=0.043, see FIG. 25*c*). Pythium symptoms did not differ visibly, however, between treatments. In both control and PA-coated seeds, large parts of the root system turned a pale brown, but the extent of this browning was not obviously different.

The absence of an effect on germination a logical consequence of the mechanism of action of C4H inhibitors. They operate by stimulating the plant immune response, which is largely absent in extremely young plants. However, in plants that survive long enough to develop beyond emergence, the effect of enhanced immunity becomes apparent in the form of enhanced seedling vigor.

REFERENCES

Brading, P. A. et al. (2000) 'Salicylic acid is not required for Cf-2- and Cf-9-dependent resistance of tomato to *Cladosporium fulvum.', The Plant journal: for cell and molecular biology,* 23(3), pp. 305-18.

Bretz, F., Hothorn, T. and Westfall, P. H. (2011) Multiple comparisons using R. CRC Press.

Byrd, D. W. et al. (1983) 'An improved technique for clearing and staining plant tissues for detection of nematodes.', *Journal of* nematology. Society of Nematologists, 15(1), pp. 142-3.

Conover, W. J. and Iman, R. L. (1981) 'Rank Transformations as a Bridge between Parametric and Nonparametric Statistics', *The American Statistician,* 35(3), pp. 124-129. doi: 10.1080/00031305.1981.10479327.

Cooper, W. R., Jia, L. and Goggin, L. (2005) 'Effects of Jasmonate-Induced Defenses on Root-Knot Nematode Infection of Resistant and Susceptible Tomato Cultivars', *Journal of Chemical Ecology*. Springer-Verlag, 31(9), pp. 1953-1967. doi: 10.1007/510886-005-6070-y.

Desaki, Y. et al. (2006) 'Bacterial Lipopolysaccharides Induce Defense Responses Associated with Programmed Cell Death in Rice Cells', *Plant and Cell Physiology,* 47(11), pp. 1530-1540. doi: 10.1093/pcp/pc1019.

Dunnett, C. W. (1955) 'A Multiple Comparison Procedure for Comparing Several Treatments with a Control', *Journal of the American Statistical Association,* 50(272), p. 1096. doi: 10.2307/2281208.

Easlon, H. M. and Bloom, A. J. (2014) 'Easy Leaf Area: Automated digital image analysis for rapid and accurate measurement of leaf area.', *Applications in plant sciences*. Botanical Society of America, 2(7). doi: 10.3732/apps.1400033.

Farmer, E. E. et al. (1994) *Diethyldithiocarbamic Acid Inhibits the Octadecanoid Signaling Pathway for the Wound Induction of Proteinase Inhibitors in Tomato Leaves'.*

Faske, T. R. and Hurd, K. (2015) 'Sensitivity of *Meloidogyne incognita* and *Rotylenchulus reniformis* to Fluopyram.', *Journal of nematology*. Society of Nematologists, 47(4), pp. 316-21.

Hoagland, D. (1938) 'The water-culture method for growing plants without soil'. Berkeley Calif.: University of California College of Agriculture Agricultural Experiment Station.

Hommel, G. (1988) 'A stagewise rejective multiple test procedure based on a modified Bonferroni test', *Biometrika*. Oxford University Press, 75(2), pp. 383-386. doi: 10.1093/biomet/75.2.383.

Ji, H. et al. (2015) 'Beta-Aminobutyric Acid-Induced Resistance Against Root-Knot Nematodes in Rice Is Based on Increased Basal Defense', *Molecular Plant-Microbe Interactions*. Molecular Plant-Microbe Interactions, 28(5), pp. 519-533. doi: 10.1094/MPMI-09-14-0260-R.

Jimmy, J. L. and Babu, S. (2015) 'Role of OsWRKY transcription factors in rice disease resistance', *Tropical Plant Pathology,* 40(6), pp. 355-361. doi: 10.1007/s40858-015-0058-0.

Kruskal, W. H. and Wallis, W. A. (1952) 'Use of Ranks in One-Criterion Variance Analysis', *Journal of the American Statistical Association,* 47(260), pp. 583-621. doi: 10.1080/01621459.1952.10483441.

Lancashire, P. D. et al. (1991) 'A uniform decimal code for growth stages of crops and weeds', *Annals of Applied Biology*. Blackwell Publishing Ltd, 119(3), pp. 561-601. doi: 10.111141744-7348.1991.tb04895.x.

Mann, H. B. and Whitney, D. R. (1947) 'On a Test of Whether one of Two Random Variables is Stochastically Larger than the Other', *The Annals of Mathematical Statistics*. Institute of Mathematical Statistics, 18(1), pp. 50-60. doi: 10.1214/aoms/1177730491.

Martinez-Medina, A. et al. (2017) 'Shifting from priming of salicylic acid- to jasmonic acid-regulated defences by *Trichoderma* protects tomato against the root knot nematode *Meloidogyne incognita', New Phytologist*. Wiley/Blackwell (10.1111), 213(3), pp. 1363-1377. doi: 10.1111/nph.14251.

Nahar, K. et al. (2011) 'The jasmonate pathway is a key player in systemically induced defense against root knot nematodes in rice.', *Plant physiology*. American Society of Plant Biologists, 157(1), pp. 305-16. doi: 10.1104/pp.111.177576.

Pfaffl, M. W., Horgan, G. W. and Dempfle, L. (2002) 'Relative expression software tool (REST) for group-wise comparison and statistical analysis of relative expression results in real-time PCR.', *Nucleic acids research*. Oxford University Press, 30(9), p. e36.

Pinheiro, J. et al. (2017) 'nlme: Linear and Nonlinear Mixed Effects Models'.

Poirier, D. J. (1973) 'Piecewise Regression Using Cubic Splines', *Journal of the American Statistical Association*. Taylor & Francis Group, 68(343), pp. 515-524. doi: 10.1080/01621459.1973.10481376.

Reversat, G. et al. (1999) 'Use of a mixture of sand and water-absorbent synthetic polymer as substrate for the xenic culturing of plant-parasitic nematodes in the laboratory', *Nematology,* 1(2), pp. 209-212. doi: 10.1163/156854199508027.

Ryu, H.-S. et al. (2006) 'A comprehensive expression analysis of the WRKY gene superfamily in rice plants during defense response', *Plant Cell Reports*. Springer-Verlag, 25(8), pp. 836-847. doi: 10.1007/s00299-006-0138-1.

Schalk, M. et al. (1998) 'Piperonylic acid, a selective, mechanism-based inactivator of the trans-cinnamate 4-hydroxylase: A new tool to control the flux of metabolites in the phenylpropanoid pathway', *Plant physiology*. American Society of Plant Biologists, 118(1), pp. 209-18. doi: 10.1104/PP.118.1.209.

Schoch, G. A. et al. (2002) 'Chemical inactivation of the cinnamate 4-hydroxylase allows for the accumulation of salicylic acid in elicited cells.', *Plant physiology*. American Society of Plant Biologists, 130(2), pp. 1022-31. doi: 10.1104/pp.004309.

Steenackers, W. J. et al. (2016) 'The allelochemical MDCA inhibits lignification and affects auxin homeostasis.', *Plant physiology*. doi: 10.1104/pp.15.01972.

Tonnessen, B. W. et al. (2014) 'Rice phenylalanine ammonia-lyase gene OsPAL4 is associated with broad spectrum disease resistance', *Plant Molecular Biology*, 87(3), pp. 273-286.

Wickham, H. (2009) Ggplot2: elegant graphics for data analysis. Springer.

Van de Wouwer, D. et al. (2016) 'Chemical Genetics Uncovers Novel Inhibitors of Lignification, Including p-Iodobenzoic Acid Targeting CINNAMATE-4-HYDROXYLASE.', *Plant physiology*. American Society of Plant Biologists, 172(1), pp. 198-220. doi: 10.1104/pp.16.00430.

Zuur, A. F. et al. (2009) Mixed effects models and extensions in ecology with R. New York, NY: Springer New York (Statistics for Biology and Health). doi: 10.1007/978-0-387-87458-6.

The invention claimed is:

1. A method for controlling and/or treating nematode infections in plants, said method comprising applying an effective amount of a compound to a plant or part thereof, or to the soil, substrate or water surrounding the plant, wherein said compound is selected from piperonylic acid (PA), or a stereoisomer, tautomer, hydrate, salt, ester and/or solvate thereof.

2. The method according to claim 1, wherein the nematode is a root knot nematode, a root-lesion nematode or a cyst nematode.

3. The method according to claim 1, wherein the nematode belongs to the genus selected from the group consisting of: *Meloidogyne, Heterodera, Globodera, Pratylenchus, Aphelenchoides, Xiphinema, Radolpholus, Bursaphelenchus, Rotylenchulus, Nacobbus, Longidorus, Ditylenchus* and *Trichodorus*.

4. The method according to claim 1, wherein the compound is used in a concentration between),1 µM and 1000 µM.

5. The method according to claim 1, wherein the compound is formulated as part of a composition which further comprises a diluent, an additive, a plant nutrient, an emulsion stabilizer, a surfactant, a buffer, a crop oil, a drift inhibitor and/or a substratum.

6. The method according to claim 1, wherein the compound is applied to the leaves of the plant, as a coat to the seeds of the plant, or as a soil or root drench.

7. The method according to claim 1, wherein the compound is applied by high or low-pressure spraying, immersion, atomizing, foaming, fogging, coating, or encrusting.

8. The method according to claim 1, wherein the compound is applied two or more times.

9. The method according to claim 1, wherein the compound is in a composition that further comprises a herbicide, insecticide, nematicide, molluscicide, bactericide, acaricide, fungicide, and/or plant growth regulator or fertilizer.

10. A method for controlling and/or treating oomycete infection in plants, said method comprising applying an effective amount of a compound to a pant or part thereof, or to the soil, substrate or water surrounding the plant, wherein said compound is selected from piperonylic acid, or a salt thereof, and wherein oomycete is *Pythium splendens*.

* * * * *